United States Patent
Kim et al.

(10) Patent No.: US 12,550,121 B2
(45) Date of Patent: Feb. 10, 2026

(54) METHOD AND APPARATUS FOR RECORDING INFORMATION IN MOBILE COMMUNICATION SYSTEM

(71) Applicant: Samsung Electronics Co., Ltd., Gyeonggi-do (KR)

(72) Inventors: Sangbum Kim, Gyeonggi-do (KR); Seungbeom Jeong, Gyeonggi-do (KR); Anil Agiwal, Gyeonggi-do (KR); Sangyeob Jung, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 464 days.

(21) Appl. No.: 18/093,084

(22) Filed: Jan. 4, 2023

(65) Prior Publication Data

US 2023/0134552 A1 May 4, 2023

Related U.S. Application Data

(63) Continuation of application No. 18/014,264, filed as application No. PCT/KR2021/010335 on Aug. 5, 2021.

(30) Foreign Application Priority Data

Aug. 5, 2020 (KR) .......... 10-2020-0098148

(51) Int. Cl.
*H04W 68/02* (2009.01)
*H04W 60/04* (2009.01)

(52) U.S. Cl.
CPC .......... *H04W 68/02* (2013.01); *H04W 60/04* (2013.01)

(58) Field of Classification Search
None
See application file for complete search history.

(56) References Cited

U.S. PATENT DOCUMENTS 10,154,535 B2   12/2018   Xu et al.
2017/0086107 A1   3/2017   Hu et al.
(Continued)

FOREIGN PATENT DOCUMENTS

KR   10-2016-0147785   12/2016
KR   10-2019-0097893   8/2019
(Continued)

OTHER PUBLICATIONS

Ericsson, "Successful Handover Report for MRO", R3-191870, 3GPP TSG-RAN WG3 #103bis, Apr. 8-12, 2019, 4 pages.
(Continued)

*Primary Examiner* — Anh Ngoc M Nguyen
(74) *Attorney, Agent, or Firm* — The Farrell Law Firm, P.C.

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Disclosed is a method by which a terminal collects information related to handover performance and efficiently reports the information to a base station.

16 Claims, 29 Drawing Sheets

(56) References Cited

U.S. PATENT DOCUMENTS

| | | | |
|---|---|---|---|
| 2021/0014825 A1* | 1/2021 | Shi | H04W 52/0229 |
| 2021/0099954 A1 | 4/2021 | Agiwal et al. | |
| 2021/0250815 A1 | 8/2021 | Lauridsen et al. | |
| 2022/0030485 A1 | 1/2022 | Kim | |
| 2023/0262542 A1 | 8/2023 | Chang et al. | |
| 2023/0379823 A1* | 11/2023 | Berggren | H04W 52/0235 |
| 2024/0259997 A1* | 8/2024 | Kuchibhotla | H04W 68/005 |

FOREIGN PATENT DOCUMENTS

| | | |
|---|---|---|
| WO | WO 2020/116938 | 6/2020 |
| WO | WO 2020/149782 | 7/2020 |

OTHER PUBLICATIONS

3GPP TR 37.816 V16.0.0, 3rd Generation Partnership Project; Technical Specification Group Radio Access Network; Study on RAN-centric Data Collection and Utilization for LTE and NR (Release 16), Jul. 2019, 35 pages.

Ericsson, "Successful Handover Report in NR", R2-1915435, 3GPP TSG-RAN WG2 #108, Nov. 18-22, 2019, 18 pages.

Qualcomm Incorporated, "Successful Handover Report", R2-2101348, 3GPP TSG-RAN WG2 Meeting #113-e, Jan. 25-Feb. 5, 2021, 5 pages.

European Search Report dated Nov. 29, 2023 issued in counterpart application No. 21854492.2-1216, 14 pages.

PCT/ISA/210 Search Report issued on PCT/KR2021/010335, Nov. 2, 2021 pp. 6.

PCT/ISA/237 Written Opinion issued on PCT/KR2021/010335, Nov. 2, 2021 pp. 4.

3GPP TS 38.300 V16.2.0 (Jul. 24, 2020) Technical Specification 3rd Generation Partnership Project; Technical Specification Group Radio Access Network; NR; NR and NG-RAN Overall Description; Stage 2 (Release 16), pp. 150.

LG Electronics Inc., "CHO Evaluation Handling during Legacy HO", 3GPP TSG-RAN WG2 Meeting #110-e R2-2005681 Online, May 22, 2020, pp. 5.

U.S. Office Action dated Aug. 15, 2025 issued in counterpart U.S. Appl. No. 18/014,264, 23 pages.

Korean Office Action dated Oct. 21, 2025 issued in counterpart application No. 10-2020-0098148, 8 pages.

* cited by examiner

FIG. 23
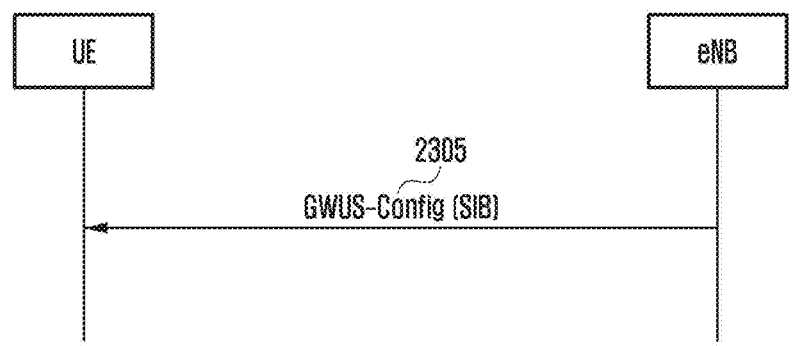
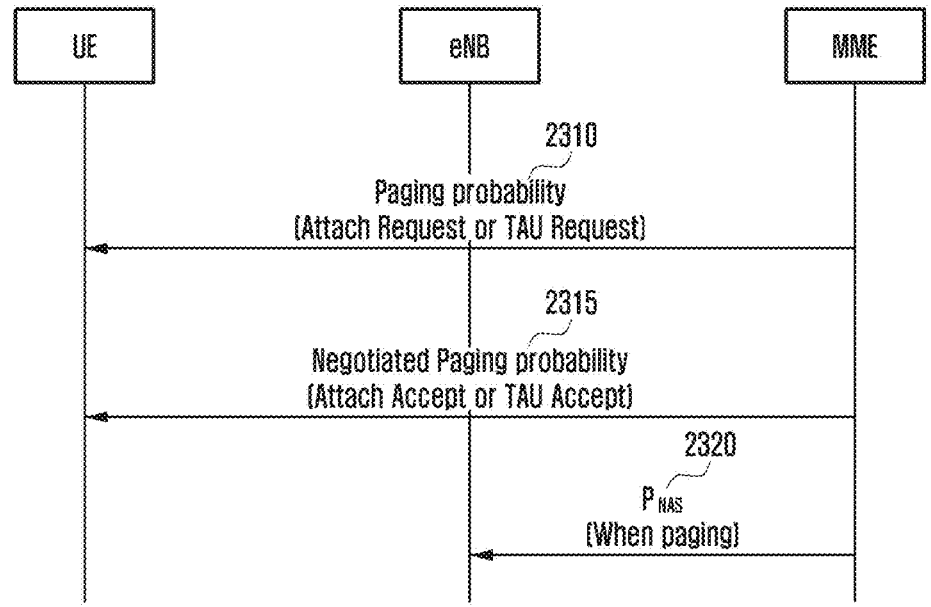

METHOD AND APPARATUS FOR RECORDING INFORMATION IN MOBILE COMMUNICATION SYSTEM

CROSS-REFERENCE TO RELATED APPLICATION(S)

This application is a Continuation of U.S. patent application Ser. No. 18/014,264, which was filed with the U.S. Patent and Trademark Office on Jan. 3, 2023, as a National Phase Entry of PCT International Application No. PCT/KR2021/010335, which was filed on Aug. 5, 2021, and claims priority to Korean Patent Application No. 10-2020-0098148, which was filed in the Korean Intellectual Property Office on Aug. 5, 2020, the entire content of each of which is incorporated herein by reference.

BACKGROUND

1. Field

The disclosure relates to an operation of a terminal and a base station in a mobile communication system.

2. Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, the need for a method for efficiently reporting, by a terminal to a base station, handover-related information collected at the time of handover has come to the fore.

SUMMARY

The disclosure has been made to address at least the above-mentioned problems and/or disadvantages and to provide at least the advantages described below.

An aspect of the disclosure proposes a method by which a terminal collects information related to performing of handover and efficiently reports the information to a base station.

In addition, another aspect of the disclosure proposes a method for solving a problem of signaling for terminal grouping, which may be caused even by a group WUS (GWUS) introduced to solve a problem of false wake-up which may occur when a wake-up (WUS) signal is used.

An aspect of the disclosure provides a method performed by a core network entity in a wireless communication system, the method including receiving, from a terminal, paging probability information; determining a paging group for the terminal based on the paging probability information; and transmitting, to the terminal, information on the paging group for the terminal.

Another aspect of the disclosure provides a method performed by a terminal in a wireless communication system, the method including identifying paging probability information; transmitting, to a core network entity, the identified paging probability information; and receiving, from the core network entity, information on a paging group for the terminal, in case that the paging group for the terminal is determined based on the paging probability information by the core network entity.

A further aspect of the disclosure provides a core network entity in a wireless communication system, the core network including a transceiver and at least one processor that is configured to receive, from a terminal via the transceiver, paging probability information; determine a paging group for the terminal based on the paging probability information; and transmit, to the terminal via the transceiver, information on the paging group for the terminal.

An aspect of the disclosure provides a terminal in a wireless communication system that includes a transceiver and at least one processor that is configured to identify paging probability information; transmit, to a core network entity via the transceiver, the identified paging probability information; and receive, from the core network entity via the transceiver, information on a paging group for the terminal, in case that the paging group for the terminal is determined based on the paging probability information by the core network entity.

According to an embodiment of the disclosure, a terminal may collect information related to performing of handover and efficiently report the information to a base station.

According to another embodiment of the disclosure, a problem of signaling for terminal grouping, which may be caused by the GWUS, may be solved.

BRIEF DESCRIPTION OF DRAWINGS

The above and/or additional aspects, features and advantages of certain embodiments of the present disclosure will become apparent and readily understood from the following description, taken in conjunction with the accompanying drawings, in which:

FIG. 23 is a diagram illustrating information exchanged between a terminal, an eNB, and an MME for terminal grouping in LTE, and a process therefor;

DETAILED DESCRIPTION

Figure 1:
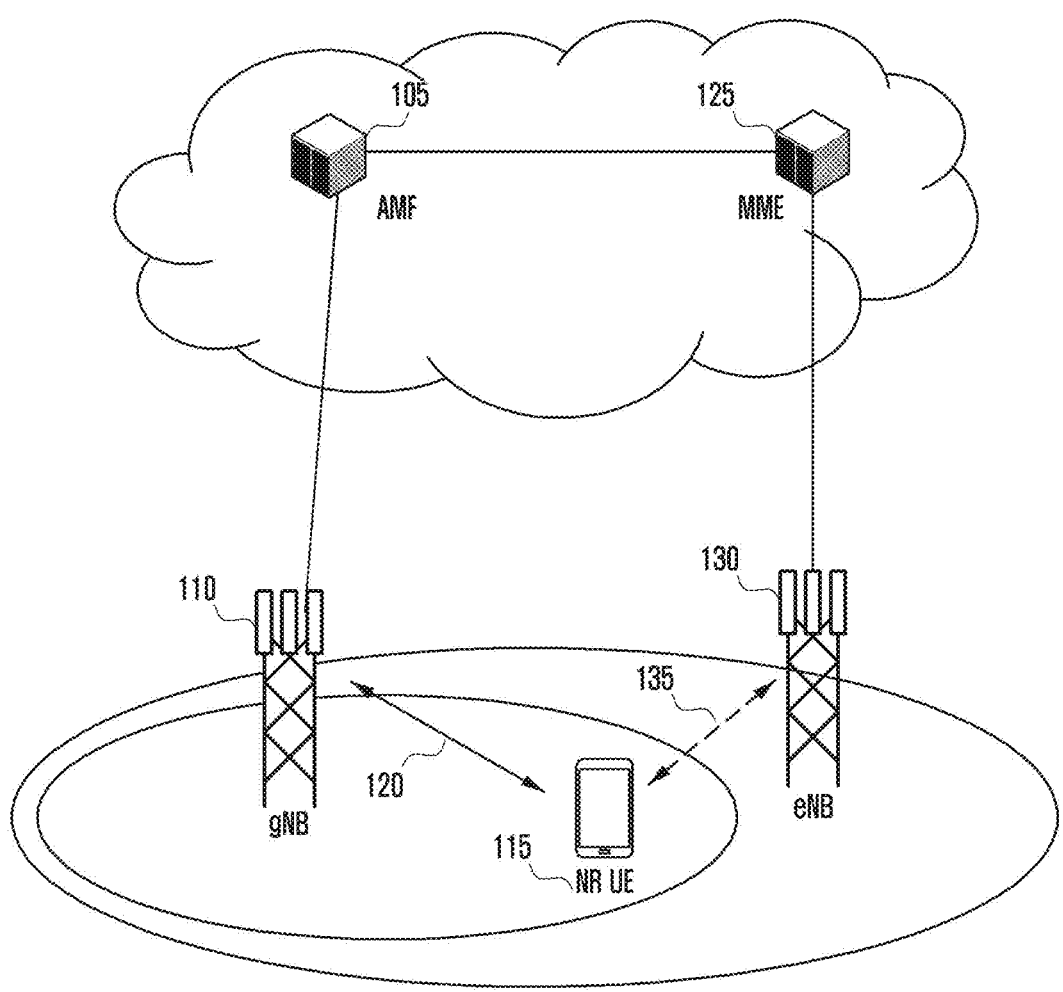
FIG. 1 is a diagram illustrating a structure of a next generation mobile communication system according to an embodiment of the disclosure.

In describing embodiments in the specification, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" may be implemented to reproduce one or more CPUs within a device or a security multimedia card.

First Embodiment

In the following description of the disclosure, a detailed description of known functions or configurations incorporated herein will be omitted when it is determined that the description may make the subject matter of the disclosure unnecessarily unclear. Hereinafter, embodiments of the disclosure will be described with reference to the accompanying drawings.

FIG. 1 is a diagram illustrating a structure of a next generation mobile communication system.

Referring to FIG. 1, as illustrated, a wireless access network of a next generation mobile communication system (new radio; NR) is configured by a next generation base station (new radio node B, hereinafter, gNB) 110 and an AMF 105 (new radio core network). A user terminal (new radio user equipment, hereinafter, an NR UE or terminal) 115 accesses an external network via the gNB 110 and the AMF 105.

In FIG. 1, the gNB corresponds to an evolved node B (eNB) of a conventional LTE system. The gNB is connected to the NR UE through a wireless channel and may provide a further outstanding service compared to a conventional node B (as indicated by reference numeral 120). In a next generation mobile communication system, all the user traffic is serviced thorough shared channels. Therefore, the next generation mobile communication system requires a device which collects pieces of state information including a buffer state, an available transmission power state, and a channel state of UEs and performs scheduling, and the gNB 110 serves as the device. One gNB generally controls a plurality of cells. In order to implement ultra-high-speed data transfer compared to conventional LTE, the conventional maximum bandwidth or wider may be employed, and a beamforming technique may be additionally integrated with an orthogonal frequency division multiplexing (hereinafter, referred to as OFDM) provided as a wireless access technique. Furthermore, an adaptive modulation & coding (hereinafter, referred to as AMC) scheme of determining a modulation scheme and a channel coding rate according to a channel state of a terminal is applied. The AMF 105 performs functions such as mobility support, bearer configuration, and QoS configuration. The AMF is a device which is responsible for various control functions as well as a mobility management function for a terminal, and is connected to a plurality of base stations. In addition, the next generation mobile communication system may also be linked to an existing LTE system, and the AMF is connected to an MME 125 via a network interface. The MME is connected to an eNB 130 that is an existing base station. A terminal supporting LTE-NR dual connectivity may transmit or receive data while maintaining a connection with an eNB as well as a gNB (as indicated by reference numeral 135).

Figure 2:
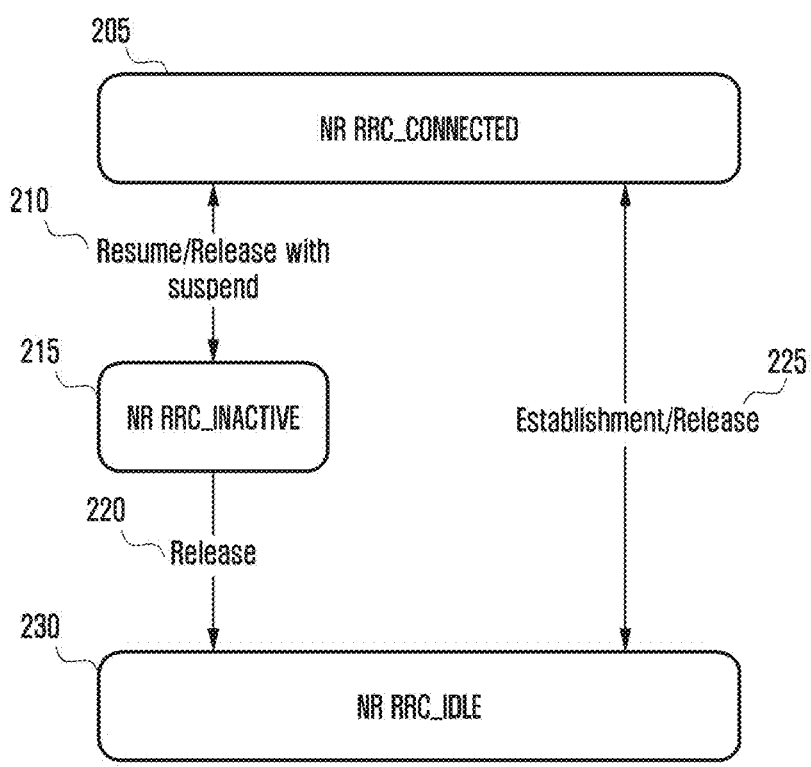
FIG. 2 is a diagram illustrating a transition of a wireless access state in a next generation mobile communication system according to an embodiment of the disclosure.

FIG. 2 is a diagram illustrating a transition of a wireless access state in a next generation mobile communication system.

A next generation mobile communication system have three wireless access states (RRC states). A connection mode (RRC_CONNECTED) 205 is a wireless access state in which a terminal is able to transmit or receive data. A standby mode (RRC_IDLE) 230 is a wireless access state in which a terminal monitors whether paging is transmitted to the terminal. The two modes are wireless access states also applied to a conventional LTE system, and a detailed technique thereof is the same as that of a conventional LTE system. In a next generation mobile communication system, an inactive (RRC_INACTIVE) wireless access state 215 is newly defined. In the wireless access state, UE context is maintained at a base station and a terminal, and RAN-based paging is supported. The features of the new wireless access state are as follows.

Cell re-selection mobility;
CN-NR RAN connection (both C/U-planes) has been established for UE;
The UE AS context is stored in at least one gNB and the UE;
Paging is initiated by NR RAN;
RAN-based notification area is managed by NR RAN;

NR RAN knows the RAN-based notification area which the UE belongs to;

The new INACTIVE wireless access state may transition to the connection mode 205 or the standby mode 230 through a particular procedure. The INACTIVE mode 215 may be switched to the connection mode 205 according to a Resume process, and the connection mode 205 may be switched to the INACTIVE mode through a Release procedure including suspend configuration information (as indicated by reference numeral 210). In the procedure, one or more RRC messages are transmitted or received between a terminal and a base station, and the procedure may include one or more stages. In addition, through a Release procedure after Resume, it is possible to switch from the INACTIVE mode 215 to the standby mode 230 (as indicated by reference numeral 220). Switching between the connection mode and the standby mode may follow a conventional LTE technology. For example, switching between the modes may be accomplished through an establishment or release procedure (as indicated by reference numeral 225).

Figure 3:
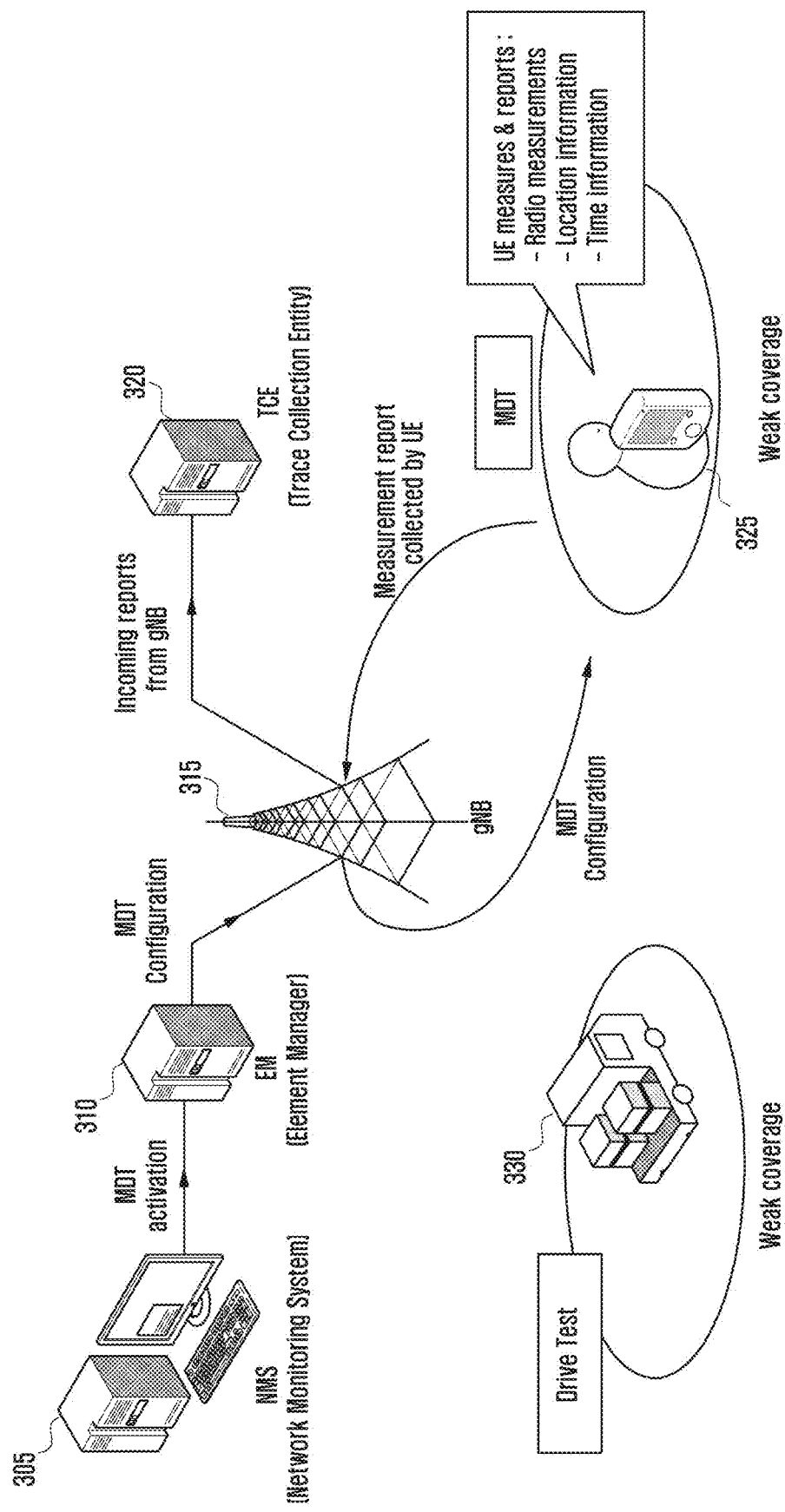
FIG. 3 is a diagram illustrating a technique of collecting and reporting cell measurement information according to an embodiment of the disclosure.

FIG. 3 is a diagram illustrating a technique of collecting and reporting cell measurement information in the disclosure.

At the time of network construction or optimization, a mobile communication service provider performs a process of measuring signal strength in a commonly predicted service area, and arranging or readjusting base stations within the service area, based on the measured signal strength. A service provider loads signal measurement equipment on a vehicle and collects cell measurement information in the service area, which requires a lot of time and cost. The process generally uses a vehicle, and thus is commonly called a drive test (as indicated by reference numeral 330). A terminal has a function of measuring a signal for a base station 315 so as to support an operation such as addition of a serving cell and cell reselection or handover at the time of inter-cell movement. Therefore, in replacement of the Drive Test, a terminal within a service area may be used, which is called minimization of drive tests (MDT) (as indicated by reference numeral 325).

A service provider may configure an MDT operation for particular terminals via various configuration devices of a network. For example, a network monitoring system (NMS) 305 may indicate MDT activation to an element manager (EM) 310. The EM 310 may transmit an MDT configuration to the base station 315. The terminals may collect signal strength information from a serving cell and neighboring cells in the connection mode (RRC_Connected), the standby mode (RRC_Idle), or the inactive mode (RRC_Inactive), and store same. In addition, the terminals may store various information, such as location information, time information, and signal quality information, together. The information stored described above may be reported to a network when the terminals are in the connection mode, and the information may be transferred to a particular server. For example, the information may be reported to a trace collection entity (TCE) 320.

The MDT operation may be generally classified by an immediate MDT and a logged MDT.

In the immediate MDT, collected information may be immediately reported to a network. Immediate reporting is required, and thus only a connection mode terminal may perform an MDT operation. For example, an RRM measurement process for supporting an operation, such as handover and addition of a serving cell, is reused, and location information and time information may be additional reported.

In the logged MDT, collected information is not immediately reported to a network and is stored, and then, after the terminal switches to the connection mode, the stored information is reported. A terminal in the standby mode, which is commonly unable to immediately transmit a report to a network, may perform same. A terminal in the inactive mode introduced in a next generation mobile communication system may perform a logged MDT. When a particular terminal is in the connection mode, a network may provide configuration information for performing of a logged MDT operation to the terminal, and the terminal may switch to the standby mode or the inactive mode, and then collect and store the configured information.

A summary of the types of MDT and an available RRC state of a terminal for each type is as shown in Table 1 below.

TABLE 1

| | RRC state |
|---|---|
| Immediate MDT | RRC_Connected |
| Logged MDT | RRC_Idle, RRC_Inactive |

Figure 4:
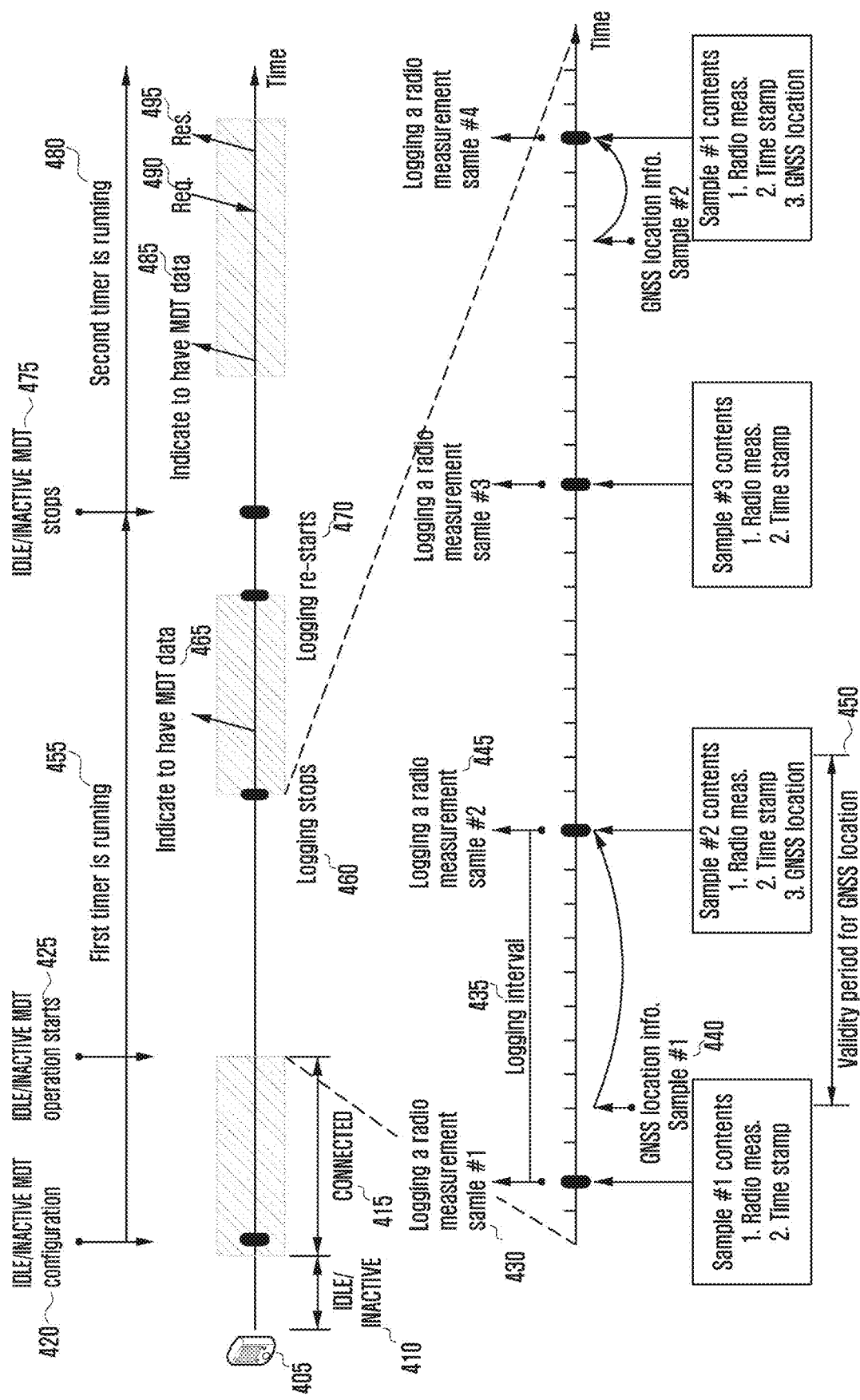
FIG. 4 is a diagram illustrating a method of collecting and reporting cell measurement information according to an embodiment of the disclosure.

FIG. 4 is a diagram illustrating a method of collecting and reporting cell measurement information in the disclosure. A terminal 405 may switch from a standby mode or inactive mode 410 to a connection mode 415. In the connection mode 415, through an immediate MDT operation, MDT data may be collected and reported to a base station. The terminal having switched to the connection mode 415 may receive logged MDT configuration information on a logged MDT performed in the standby mode or inactive mode from the base station (as indicated by reference numeral 420). The configuration information may be accommodated in a predetermined RRC message so as to be transmitted to the terminal, and the terminal having received the message may drive a first timer (as indicated by reference numeral 455). Until the first timer is expired, the terminal may perform a logged MDT operation in a standby mode or inactive mode interval. A value of the first timer may be included in the logged MDT configuration information. When the terminal switches to the standby mode or inactive mode, the terminal may perform a logged MDT according to the received configuration information (as indicated by reference numeral 425). The terminal may store predetermined pieces of information collected in every logging interval 435 that is a configured period (as indicated by reference numerals 430 and 445). In addition, when valid location information 440 is collected, the terminal is required to also store the information. The terminal may determine that the location information is valid, before passage of a predetermined time 450 after collection of the information. The predetermined time is identical to or shorter than the logged interval. Even before the first timer is expired, the terminal may temporarily stop a logged MDT operation, which has been being performed, when switching to the connection mode (as indicated by reference numeral 460). However, the first timer may be continuously operated without being stopped even in a connection mode interval. For example, the first timer may be continuously operated regardless of the RRC state being changed. However, the first timer may be stopped when a terminal memory storing MDT data is insufficient and thus is unable to store no longer, or when the logged MDT configuration information is released. A case when the logged MDT configuration information is released may be a case when different Logged MDT configuration information is provided from a serving RAT or a different RAT, or when the terminal is detached or is powered off. The terminal may report, to the base station, that the terminal has collection information (MDT data) stored in the terminal, by using an RRC Setup Complete message or RRC Resume Complete message during a connection establishment process (RRC Connection Establishment) or a connection restart process (RRC Connection Resume) (as indicated by reference numeral 465).

The connection establishment process may be a process in which the terminal switches from the standby mode to the connection mode. As described later, the process commonly includes three stages, and three types of RRC messages may be used.

First stage: The terminal transmits an RRC Setup Request message to the base station.
    Second stage: The base station transmits an RRC Setup message to the terminal.
    Third stage: The terminal transmits an RRC Setup Complete message to the base station.

The connection restart process may be a process in which the terminal switches from the inactive mode to the connection mode. As described later, the connection restart process commonly includes three stages, and three types of RRC messages may be used.

First stage: The terminal transmits an RRC Resume Request message to the base station.
    Second stage: The base station transmits an RRC Resume message to the terminal.
    Third stage: The terminal transmits an RRC Resume Complete message to the base station.

The terminal may report, to a target base station, information indicating that the terminal has the collection information, even during a connection reestablishment process (RRC Connection Reestablishment) and a handover process other than the connection establishment process or connection restart process. When the logged MDT is configured, but there is no collected and stored information yet, the reporting may be omitted. The base station having received the reporting may request reporting of MDT data stored in the terminal if necessary. MDT data that has not been reported is required to be continuously stored in the terminal for a predetermined time. When the terminal is switched to the standby mode or inactive mode again, and the first timer has not been expired yet, the terminal may restart a logged MDT operation again (as indicated by reference numeral 470). When the first timer is expired, the terminal may stop a logged MDT operation (as indicated by reference numeral 475). The terminal having stopped the operation may drive a second timer (as indicated by reference numeral 480), and maintain stored MDT data until the timer is expired. After the timer is expired, whether to remove stored MDT data may be determined through terminal implementation. A value of the second timer may be included in the logged MDT configuration information, or the value is not configured and a pre-defined value may be applied. When the terminal is switched to the connection mode again, the terminal may report, to the base station, that the terminal has collection information (MDT data) stored in the terminal (as indicated by reference numeral 485). In this time, the base station may request reporting of MDT data stored in the terminal by using a predetermined RRC message (as indicated by reference numeral 490). The terminal may accommodate MDT data stored therein in a predetermined RRC message, and report the message to the base station (as indicated by reference numeral 495).

Figure 5:
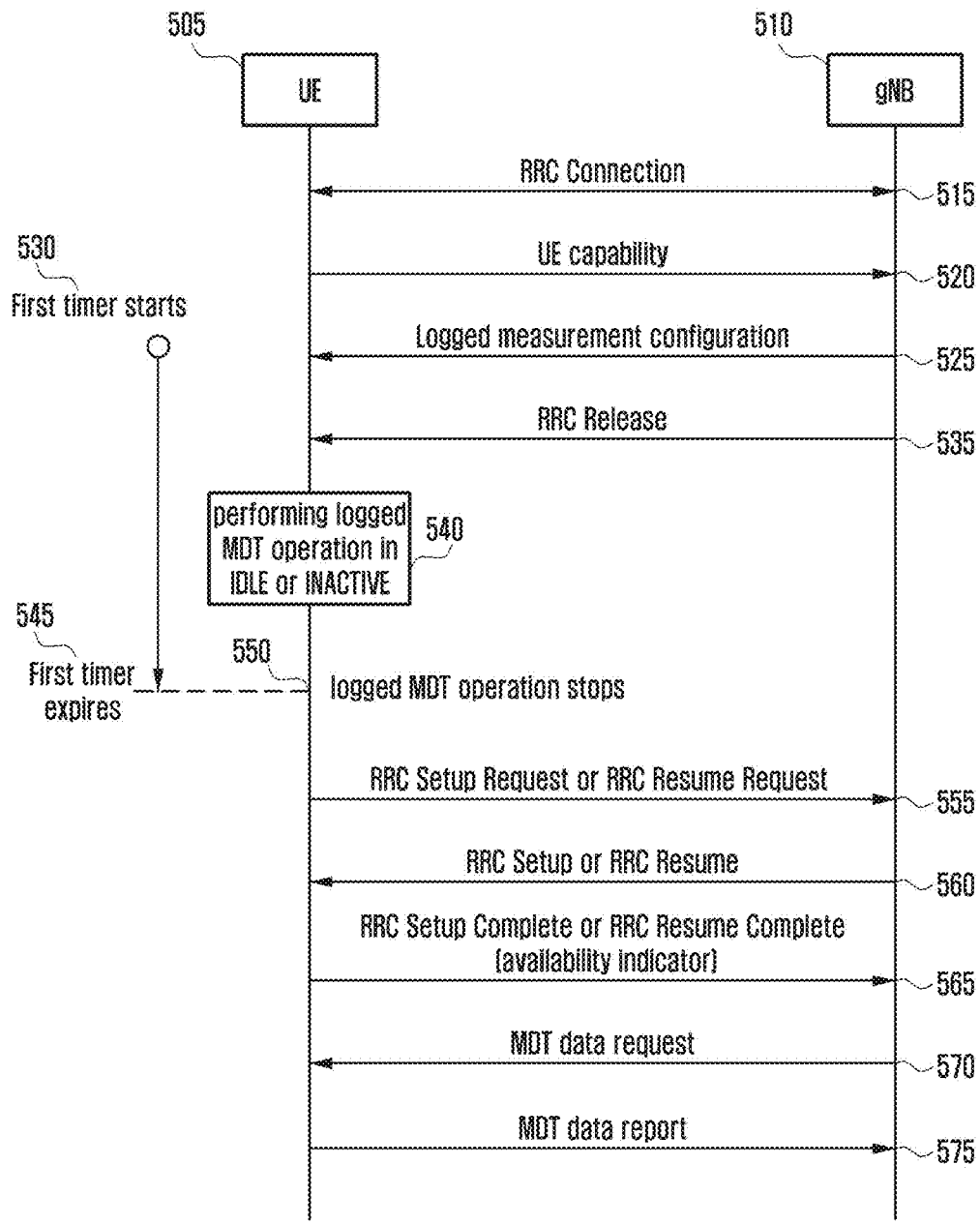
FIG. 5 is a flowchart of an operation of collecting and reporting cell measurement information according to an embodiment of the disclosure.

FIG. 5 is a flowchart of an operation of collecting and reporting cell measurement information in the disclosure.

A terminal 505 may establishment a connection with a base station 510 (operation 515). The terminal may provide terminal capability information to the base station (operation 520), and indicate whether the terminal supports an MDT operation and which frequency the terminal is able to measure. The base station may accommodate configuration information required to perform a logged MDT operation in a predetermined RRC message, and transmit the message to the terminal (operation 525). For example, the configuration information may include at least one of pieces of information below.

Trace reference information

Trace recording session reference information

Trace collection entity (TCE) ID information: The base station transmits MDT data information reported by the terminal to a data server designated by the TCE ID.

Absolute time information (absolute time): This indicates an absolute time in a current cell providing logged MDT configuration information.

Area configuration: This is area information on an area in which measurement information may be collected and stored through a logged MDT operation, and is indicated in the unit of cells. In addition, this may include RAT information on an RAT required to collect measurement information. A list contained in the RAT information is a black list or a white list. If the list is a black list, cell measurement information is collected for an RAT not included in the list. If the list is a white list, cell measurement information is not collected for an RAT not included in the list.

Logging duration: This is a value of the first timer, and a logged MDT operation is performed in a standby mode or inactive mode while the timer is driven.

Logging interval: This is a period according to which collected information is stored.

plmn-IdentityList (i.e., MDT PLMN list): This is PLMN list information, and accommodates PLMN information on a PLMN which may not only perform the Logged MDT operation, but also report whether MDT data is stored and report MDT data.

Indicator indicating whether a logged MDT operation is performed in the standby mode, the inactive mode, or both. The indicator may indicate an RRC state in which a logged MDT operation is performed, or a logged MDT operation being always performed in the standby mode and inactive mode may be defined without the indicator. The terminal performs a logged MDT operation only in an RRC state indicated by the indicator.

Indicator indicating whether to collect and store beam level measurement information. In a next generation mobile communication system, a beam antenna may be applied. Without the indicator, defined may be a beam level measurement being always collected and stored for a frequency at which a beam-based operation is performed.

Information of the maximum number of collected or stored beams, and minimum signal strength information of stored beams. The terminal may not store information of a beam having a signal strength smaller than the minimum signal strength. When all beams are weaker than the configured minimum signal value, the terminal may store one piece of beam information on a beam having the strongest signal strength among the beams, or include an indicator indicating that all the beams are weaker than the configured minimum signal value.

Indicator indicating whether an MDT retrieval operation is able to be triggered in a second stage restart process (RRC Resume)

The terminal having received the logged MDT configuration information may drive a first timer (operation 530). A value of the first timer may be configured to be the same as a value of the logged duration. The base station may switch the terminal to be in a standby mode or inactive mode by using an RRC Release message (operation 535). According to which RRC state in which the terminal is switched to be, the RRC Release message may accommodate configuration information for an operation in the RRC state. When the first timer is in operation, the terminal may perform a logged MDT operation in the standby mode or inactive mode (operation 540). The terminal may measure signal strength of a serving cell and neighboring cells, and obtain location information. When a beam level measurement is configured, the terminal may collect signal strength values of beams having values larger than the configured minimum value in a serving cell and neighboring cells, and store the collected values. The maximum number of beams which the terminal is able to store may also be configured or predefined. The signal strength may indicate reference signal received power (RSRP), reference signal received quality (RSRQ), or signal-to-noise and interference ratio (SINR). The terminal may store the collected information according to the logged interval period. When the first timer is expired (operation 545), the terminal may stop the logged MDT operation (operation 550). When the terminal is in a standby mode or inactive mode according to the RRC Release message, and the terminal receives RAN or CN paging from the base station or MO data transmission is activated, the terminal may initialize an establishment process or Resume process for switching from the standby mode or inactive mode to a connection mode.

The establishment process or resume process may be configured by three stages below.

First stage: The terminal transmits an RRC Setup Request message or an RRC Resume Request message to the base station (operation 555).

Second stage: The base station transmits an RRC Setup message or an RRC Resume message to the terminal (operation 560).

Third stage: The terminal transmits an RRC Setup Complete message or an RRC Resume Complete message to the base station (operation 565).

The terminal may accommodate, in an RRC Setup Complete or RRC Resume Complete message, an indicator indicating whether there is MDT data stored in the terminal. The base station having received the RRC Setup Complete message may request reporting of the MDT data to the terminal by using a predetermined RRC message that is UEInformationRequest, if necessary (operation 570). The terminal having received the request may report the MDT data by using a predetermined RRC message that is UEInformationResponse (operation 575).

In the disclosure, in relation to a normal handover operation, when a terminal receives configuration information indicating performing of a handover from a base station, the terminal immediately performs a handover operation. Meanwhile, in relation to a condition-based handover operation, when a terminal receives configuration information indicating performing of a handover from a base station, the terminal does not immediately perform a handover operation and performs a handover operation when a configured predetermined condition is satisfied. Due to the above feature, the condition-based handover operation is called a conditional handover (CHO). Since a terminal is able to identify a change of a channel quality state the fastest, it is advantageous for a terminal to determine a time point of starting a handover operation so as to minimize a probability of handover failure. Therefore, a condition-based handover may be considered to be a further evolved technology compared to a normal handover. The normal handover considers only one target cell, but the condition-based handover may consider one or more target cells. The number of target cells considered in a condition-based handover is determined by a network.

Figure 6:
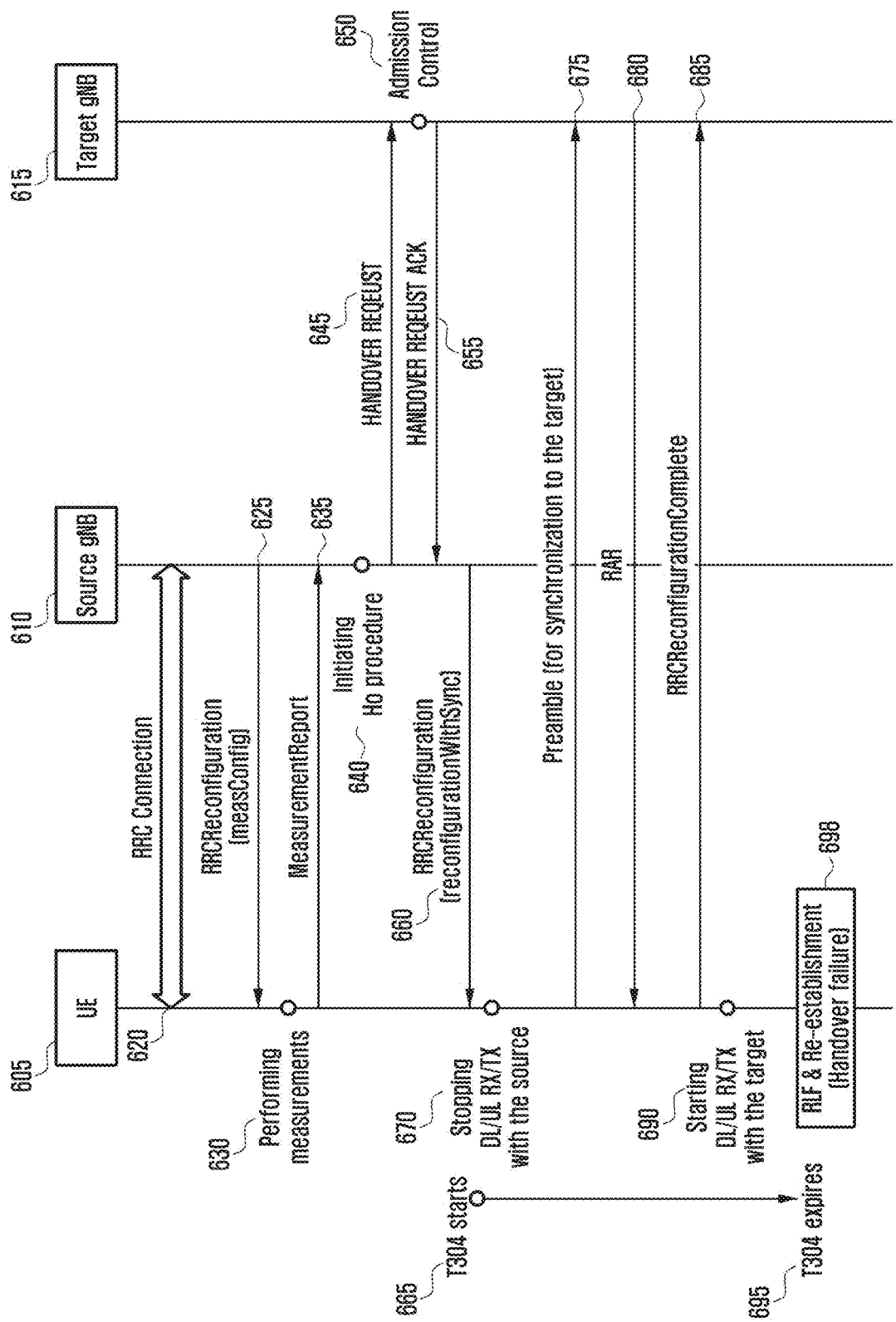
FIG. 6 is a flowchart of a normal handover operation according to an embodiment of the disclosure.

FIG. 6 is a flowchart of a normal handover operation according to an embodiment of the disclosure.

A terminal 605 may perform a data transmission or reception operation in a state of a mode of connection with a source cell 610 (operation 620). The terminal may receive a predetermined RRC message including measurement configuration information (measurement configuration) from the source cell (operation 625). The terminal may apply the measurement configuration information to measure signal quality of a serving cell and neighboring cells (operation 630), and report collected cell measurement information to the source cell periodically or when a configured event occurs (operation 635). The source cell 610 may determine whether to trigger a normal handover operation, based on the reported cell measurement information (operation 640). For example, when cell measurement information is reported due to satisfaction of an event A3 (neighbour becomes offset better than SpCell), the source cell 610 may determine a normal handover. When the normal handover is determined to be triggered, the source cell 610 may request the normal handover to one target cell 615 through a predetermined inter-node message (operation 645). The target cell 615 having received the request may accept the request by using a predetermined admission control (operation 650), and transmit handover configuration information required for the normal handover operation to the source cell 610 (operation 655). The source cell 610 may accommodate the handover configuration information received from the target cell 615 and additional configuration information in a predetermined RRC message, and transmit the RRC message to the terminal (operation 660). The configuration information may include the ID of the target cell, frequency information, configuration information (dedicated preamble information, dedicated radio resource information, etc.) required for an operation of random access to the target cell, transmission power information, and information of a C-RNTI used in the target cell.

The terminal 605 having received the handover configuration information may perform a process of random access to the target cell 615 and drive a T304 timer (operation 665). In addition, the terminal 605 may stop the operation of data transmission or reception with the source cell 610 (operation 670). The terminal 605 may transmit the provided preamble (operation 675). When a dedicated preamble is not provided, the terminal 605 may transmit one of preamble used based on contention. The target cell 615 having received the preamble may transmit a random access response message (Random Access Response; RAR) to the terminal 605 (operation 685). The terminal 605 may transmit a msg3 to the target cell 615 by using UL grant information accommodated in the RAR (operation 685). The msg3 may accommodate an RRCReconfigurationComplete message. When the random access process is successfully completed, the normal handover may be considered to be successfully completed, and the terminal 605 may stop the T304 timer being operated. In addition, the terminal 605 may perform an operation of data transmission or reception with the target cell 615 (operation 690). When the normal handover is not successfully completed until the T304 timer is expired (operation 695), the terminal 605 may consider that the handover has failed. The terminal 605 may declare an RLF, and perform a re-establishment operation (operation 698). When the RLF is declared, the terminal 605 may record useful information which is able to be collected at that time, and when the terminal is connected to one cell later, the terminal may report an RLF report.

Figure 7:
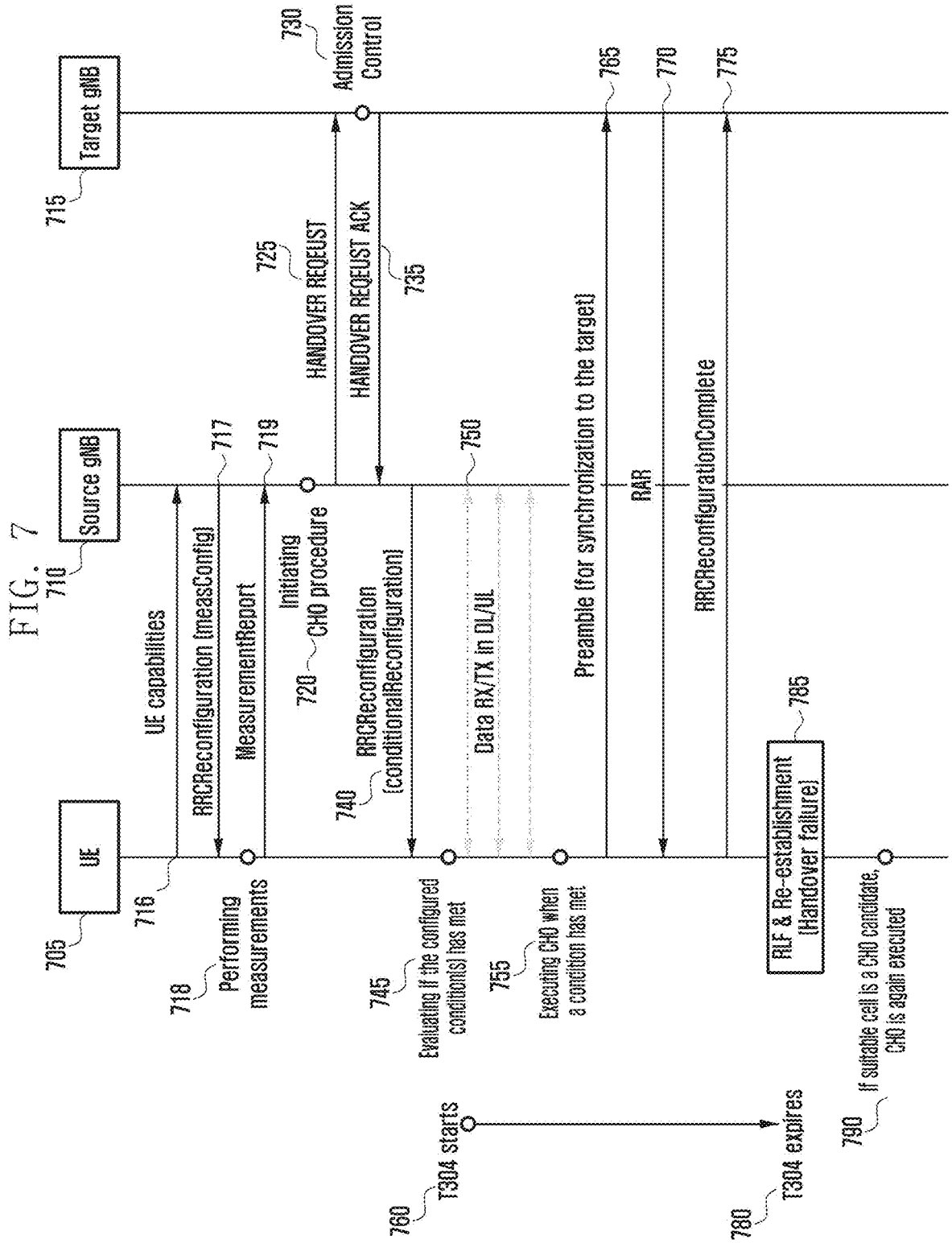
FIG. 7 is a flowchart of a condition-based handover operation according to an embodiment of the disclosure.

FIG. 7 is a flowchart of a condition-based handover operation according to an embodiment of the disclosure.

A terminal 705 may report capability information of the terminal to a source cell 710 (operation 716). The capability information may indicate whether the terminal 705 supports a condition-based handover. The terminal 705 may receive a predetermined RRC message including measurement configuration information (measurement configuration) from the source cell 710 (operation 717). The terminal 705 may apply the measurement configuration information to measure signal quality of a serving cell and neighboring cells (operation 718), and report collected cell measurement information to the source cell 710 periodically or when a configured event occurs (operation 719). The source cell 710 may determine whether to trigger a condition-based handover operation, based on the reported cell measurement information (operation 720). In order to configure the condition-based handover, the terminal 705 is required to support the condition-based handover. When the condition-based handover is determined to be triggered, the source cell may request the condition-based handover to one or more target cells 715 through a predetermined inter-node message (operation 725). The target cells 715 having received the request may accept the request through a predetermined admission control (operation 730), and transmit handover configuration information required for the condition-based handover operation to the source cell 710 (operation 735). The target cells 715 having not accepted the request may be excluded from the condition-based handover. The source cell 710 may accommodate the handover configuration information received from the target cells 715 and additional configuration information in a predetermined RRC message, and transmit the RRC message to the terminal 705 (operation 740). The configuration information may include the ID of the target cells, frequency information, configuration information (e.g., dedicated preamble information, dedicated radio resource information, etc. for each target cell) required for an operation of random access to the target cells, transmission power information, information of a C-RNTI used in each target cell, and conditions to trigger the operation of random access to each target cell. Each of the above conditions may be different according to each target cell, and multiple conditions may be configured for one target cell. An attemptCondReconfig field included in the configuration information is an indicator indicating whether to perform a condition-based handover to a suitable cell found in the first cell selection operation after handover failure, when the cell is one of candidate target cells of the condition-based handover.

The terminal 705 having received the handover configuration information may assess whether the provided condition(s) is satisfied (operation 745). Until the condition is satisfied, the terminal 705 may maintain an operation of data transmission or reception with the source cell 710 (operation 750). When a condition related to a particular target cell is satisfied (operation 755), the terminal 705 may perform a process of random access to the target cell and drive a T304 timer (operation 760). For example, when an event A3 (neighbour becomes offset better than SpCell) is configured as the condition and is satisfied, the terminal 705 may transmit the provided preamble to the associated target cell (operation 765) When a dedicated preamble is not provided, the terminal 705 may transmit one of preamble used based on contention. The target cell having received the preamble may transmit a random access response message (Random Access Response; RAR) to the terminal 705 (operation 770). The terminal 705 may transmit a msg3 to the target cell by using UL grant information accommodated in the RAR (operation 775). The msg3 may accommodate an RRCReconfigurationComplete message. When the random access process is successfully completed, the condition-based handover may be considered to be successfully completed, and the terminal 705 may stop the T304 timer being operated. When the condition-based handover is not successfully completed until the T304 timer is expired (operation 780), the terminal 705 may consider handover failure. The terminal 705 may declare an RLF, and perform a re-establishment operation (operation 785). When a suitable cell found through a cell selection operation in the re-establishment operation is one of candidate target cells for the condition-based handover, a handover may be performed again to the cell (operation 790).

When the handover is successfully completed, the terminal 705 may remove handover configuration information. When the success of the handover is reported to the source cell from the target cell, context information of the terminal may be removed. Whether the handover is successful may also be determined through a UE context release message that is an inter-node message transmitted from a target cell to a source cell. In addition, the source cell may indicate to other candidate target cells included in the handover configuration information to remove the handover configuration information (or UE context information) (or the source cell may notify that the information is no longer valid). When a predetermined time has passed after the handover is requested, the candidate target cells may also autonomously remove the handover configuration information without an indication of the source cell.

The disclosure proposes a method by which a terminal collects relevant information on a successfully completed handover and reports the information to a base station, and a method for, when a condition-based handover to a target cell fails, reporting the failure.

Figure 8:
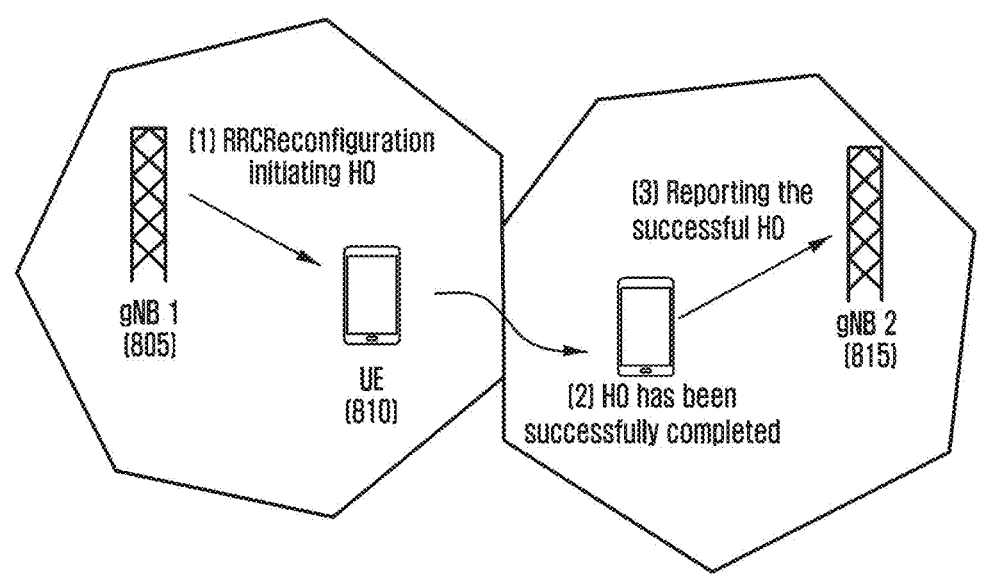
FIG. 8 is a diagram illustrating a process of reporting information related to a successfully completed handover to a target cell according to an embodiment of the disclosure.

FIG. 8 is a diagram illustrating a process of reporting information related to a successfully completed handover to a target cell according to an embodiment of the disclosure.

A terminal 810 may receive an RRC message including handover configuration information from a source base station 805. The terminal 810 may perform a handover operation according to the handover configuration information. When the terminal 810 fails to successfully complete the handover operation, the terminal may declare an RLF and store valid information at that time. The stored information is reported to a base station connected later, and may be used for a network to identify a problem in the handover operation, and determine optimal configuration parameter values. On the contrary, when the terminal 810 has successfully completed the handover operation, the terminal only transmits an RRC message indicating the success to a target cell, and may not store and report other information. Therefore, when a process to complete the handover operation has not been smooth, a network is unable to collect information that is a basis to determine the unsmooth process. For example, although a handover operation is successfully completed, a random access process may have failed several times. Therefore, this embodiment proposes a method by which, when a handover operation is successfully completed, the terminal 810 stores valid information and reports the information to the target cell 815. In addition, the embodiment proposes information enabling a network to identify a problem in a handover successfully completed by the terminal 810, among pieces of information related to the handover.

Figure 9:
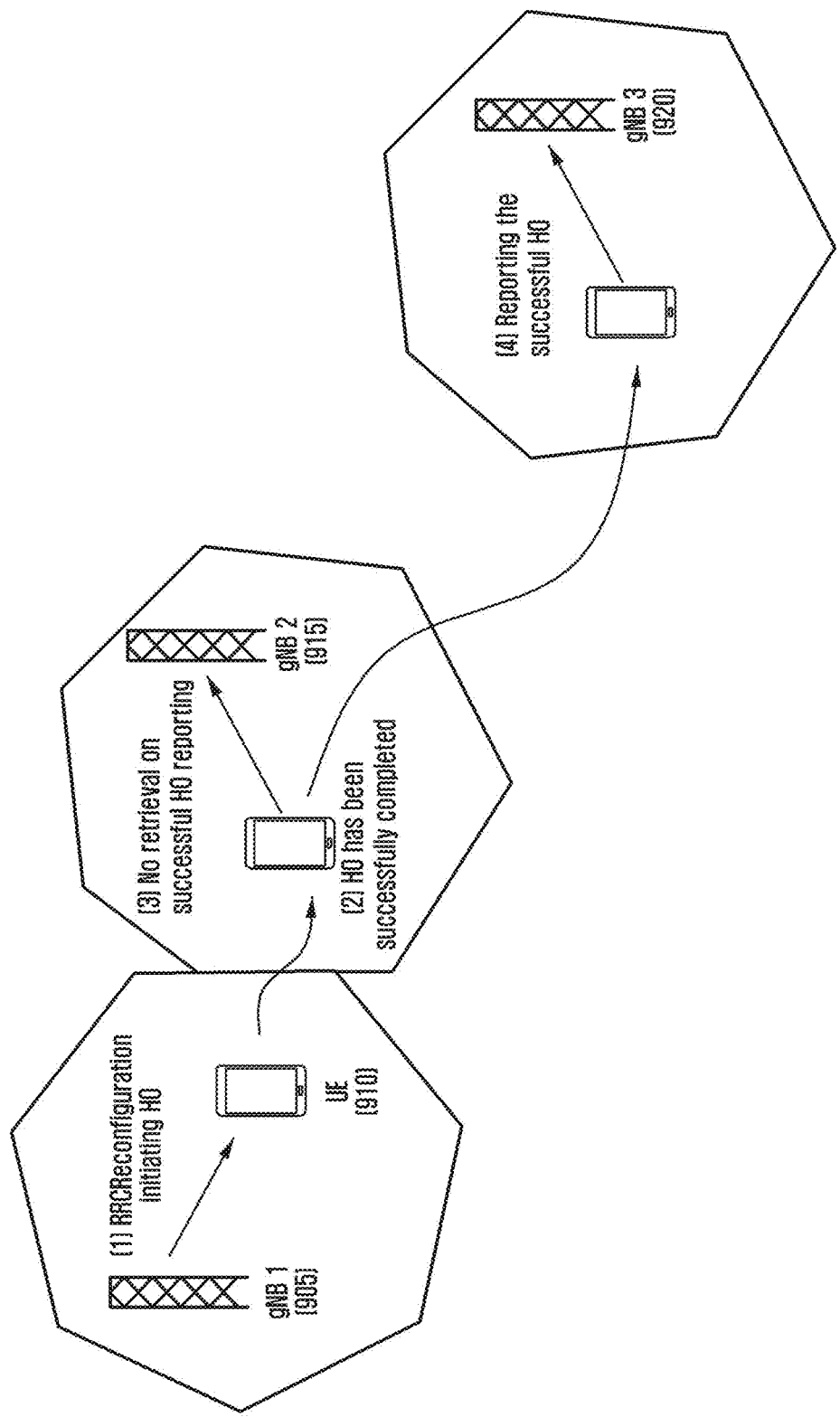
FIG. 9 is a diagram illustrating a process of reporting information related to a successfully completed handover to a different cell according to an embodiment of the disclosure.

FIG. 9 is a diagram illustrating a process of reporting information related to a successfully completed handover to a different cell according to an embodiment of the disclosure.

As described above, information related to a successfully completed handover may be used to further optimize configuration information related to a conventional handover operation. After a handover configured by a source base station 905 is completed, a terminal 910 may report the information related to the handover to a target base station 915. However, the target base station may not be in a proper timing to receive reporting of the information because of being in a network congestion state. The information to be reported is not information urgently required for the target base station. Therefore, the target base station may not require the information from the terminal 910. The terminal 910 may consider two operations. The first operation is to remove the stored handover-related information immediately. The second operation is to have the stored handover-related information for a predetermined time without removing same, and when a predetermined event occurs, report the information to a connected base station 920. The connected base station may be a different predetermined base station other than the source base station and the target base station. The base station is required to support a PLMN supported by the source base station or the target base station. The predetermined event is a case of performing a setup or resume process for a base station, a case of performing another handover, or a case of performing a re-establishment operation for a base station.

Figure 10:
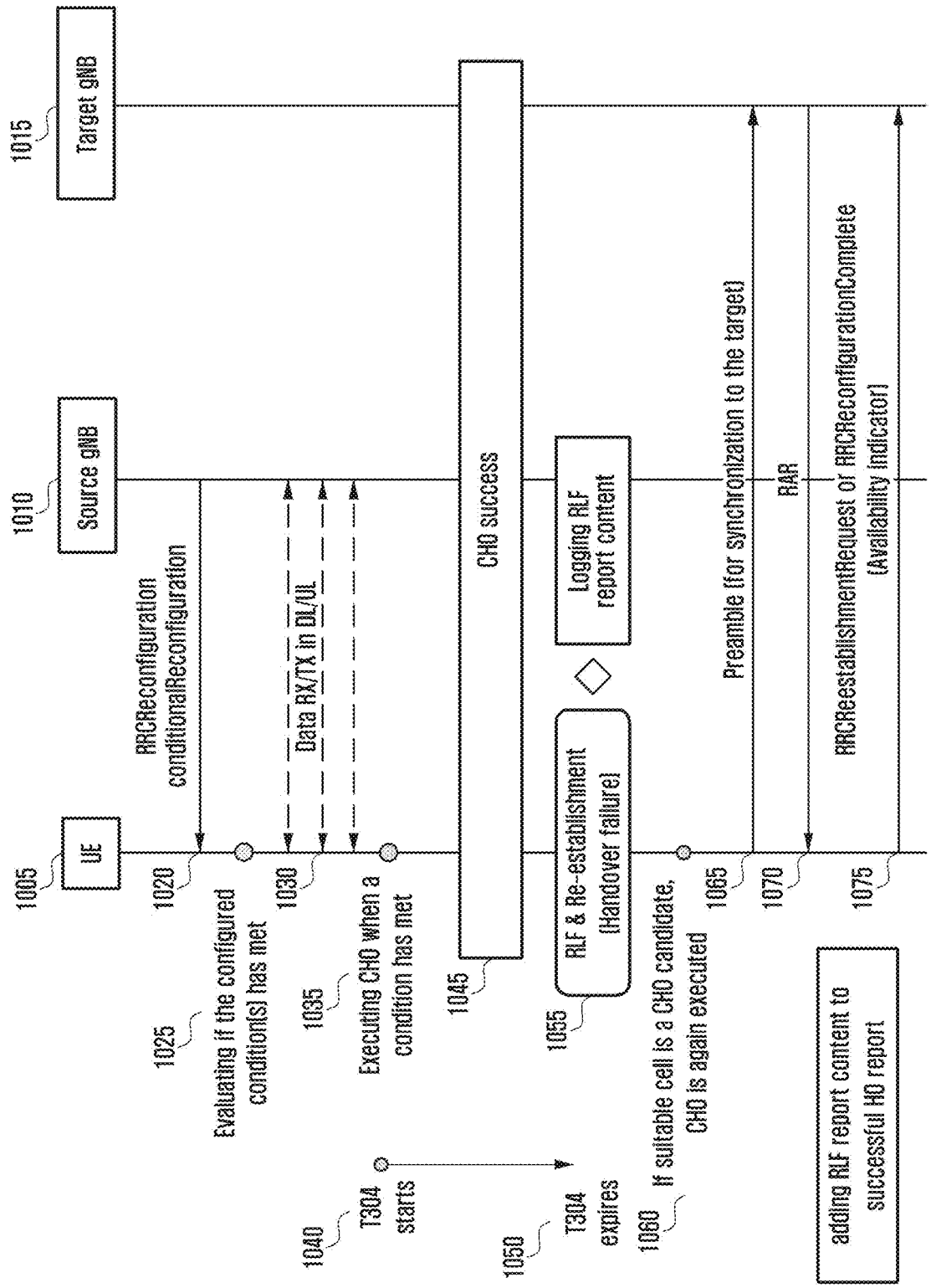
FIG. 10 is a flowchart of an operation of reporting information related to a successfully completed condition-based handover to a different cell according to an embodiment of the disclosure.

FIG. 10 is a flowchart of an operation of reporting information related to a successfully completed condition-based handover to a different cell according to an embodiment of the disclosure. This operation is described based on a condition-based handover, but if there is no particular mention, the operation may be identically applied to a general or DAPS handover.

A terminal 1005 may receive handover configuration information to a source base station 1010 (operation 1020). The handover configuration information may be related to one of a normal handover, a condition-based handover, or a DAPS handover. When the information is related to a normal handover or a DAPS handover, the terminal 1005 may immediately perform an operation of handover to a target cell 1015 and drive a T304 timer. When the information is related to a condition-based handover, the terminal 1005 may determine whether a condition to trigger the handover operation is satisfied (operation 1025). Until at least one of conditions as described above is satisfied, the terminal 1005 may continue to perform an operation of data transmission or reception with the source base station (operation 1030). When one condition is satisfied, the terminal 1005 may drive a T304 timer (operation 1040), and perform an operation of handover to the target cell (operation 1035).

When the handover is successfully completed, the terminal 1005 may store information on the handover at the following time points.

When a terminal transmits a first preamble to a target base station, the terminal may store predetermined successful HO reporting information.

When a terminal transmits an RRCReconfigurationComplete message to a target base station, the terminal may store predetermined successful HO reporting information. The RRCReconfigurationComplete message may include an indicator indicating that the terminal has the predetermined information stored therein. When the message is transmitted, but a feedback indicating successful reception of the message fails to be received from a target base station, the terminal may remove the stored information.

When a terminal has successfully complete transmission of an RRCReconfigurationComplete message to a target base station (when a feedback indicating successful reception of the message has been received from a target base station), the terminal may store predetermined successful HO reporting information. The RRCReconfigurationComplete message may include an indicator indicating that the terminal has the predetermined information stored therein.

When the triggered handover is a DAPS handover, the terminal 1005 may store information on the handover at one of the following time points.

When a terminal receives an RRCReconfiguration message including a daps-SourceRelease field from a target base station, the terminal may store predetermined successful HO reporting information. The target base station transmitting the field to the terminal may imply indicating, to the terminal, to stop data transmission or reception with a source base station.

When a terminal switches an uplink to a target base station, the terminal may store predetermined successful HO reporting information. After the terminal receives an RRCReconfigurationComplete message from the target base station, an RRC of the terminal may request a PDCP of the terminal to switch an uplink to a target base station.

When a terminal transmits an RRCReconfigurationComplete message to a target base station, the terminal may store predetermined successful HO reporting information.

When a terminal has successfully complete transmission of an RRCReconfigurationComplete message to a target base station (when a feedback indicating successful reception of the message has been received from a target base station), the terminal may store predetermined successful HO reporting information.

The predetermined successful HO reporting information is as follows.

ID information of a source cell and a target cell. Since a terminal may report the information in a cell other than a source cell and a target cell, the terminal is required to store ID information of a source cell and a target cell involved in a handover operation.

Signal strength qualities (RSRP, RSRQ, etc.) of a source cell, a target cell, and neighboring cells, which are valid and are collected at a predetermined time point after handover configuration information is received.

Terminal position information and time information at a predetermined time point after handover configuration information is received. For example, the predetermined time point may indicate a time point at which a preamble is transmitted, a time point at which a condition is satisfied in a case of a condition-based handover, a time point at which an RRCReconfigurationComplete message is transmitted to a target cell, or a time point when an RRCReconfiguration message including a daps-SourceRelease field is received from a target cell in a case of a DAPS handover.

Information of a required time after handover configuration information is received, and information of a required time after a handover is successful.

Random access-related information related to a random access which has been performed during a handover operation. For example, the random access-related information may be index information of a CSI-RS or an SSB having been used to perform a random access, the number of transmissions of a preamble in each SSB or CSI-RS, whether contention has occurred, an indicator indicating whether the signal strength quality of an SSB or CSI-RS is better than a predetermined RSRP threshold value, and information on a wireless resource which has been used for preamble transmission.

In a case of a condition-based handover, information of a condition which has triggered a handover, and the signal strength qualities (RSRP, RSRQ, etc.) of a source cell, a target cell, and neighboring cells when a handover is executed according to the condition, when a suitable cell found after failure of the first condition-based handover (after expiration of T304, occurrence of RLF) is a candidate target cell of a condition-based handover and a handover to the cell is performed and successful, ID information of a target cell having failed in the first handover, indicator information indicating whether the second handover is allowed, and attemptCondReconfig field information.

In a case of DAPS handover, maximum terminal transmission power available in a source cell and a target cell, uplinkPowerSharingDAPS-Mode field information, and the number of DRBs for which DAPS is configured.

When a handover is not successfully completed before the T304 timer is expired, the terminal 1005 may consider same as handover failure and declare RLF. The terminal 1005 may collect valid information and store same in the terminal variable VarRLF-Report. In addition, the terminal may trigger a re-establishment operation (operation 1055). The terminal 1005 may discover one suitable cell through a cell selection operation.

In a case where the failure is in a normal handover, the terminal 1005 may transmit an RRCReestablishmentRequest message to the suitable cell through a random access process (operations 1065 and 1070) (operation 1075). The terminal 1005 may include an indicator indicating that there is an RLF report stored in the terminal, in an RRCReestablishmentComplete message, and report the message to the target cell or a different cell. When the RLF report has been reported to the cell, the terminal 1005 may remove the RLF report.

In a case where the failure is in a condition-based handover, when the found suitable cell is a candidate target cell of the condition-based handover, and the attemptCondReconfig field is configured to be True, the terminal 1005 may perform a condition-based handover to the suitable cell (operation 1060). The terminal 1005 may transmit a preamble to the cell (operation 1065) and receive a RAR from the cell (operation 1070). The terminal 1005 may transmit an RRCReconfigurationComplete message to the cell (operation 1075). The terminal 1005 may include an indicator indicating that there is a successful HO report stored in the terminal, in an RRCReestablishmentComplete message, and report the message to the target cell or a different cell. The terminal 1005 may store successful HO reporting information at a time point described above. Contents (or some contents) of the RLF report stored when the T304 has been expired may be included in the successful HO report indicating success of the second CHO. Alternatively, an indicator indicating that there has been RLF in the series of handover operations may be included therein. As another method, a successful HO report and an RLF report may be independently reported to a base station.

When the successful HO report (and the RLF report) has been reported to the cell, the terminal 1005 may remove the report.

The successful HO report and the RLF report may be requested to a terminal by a base station by using a UEInformationRequest message, and the terminal having received the request may report the report by using a UEInformationResponse message.

Figure 11:
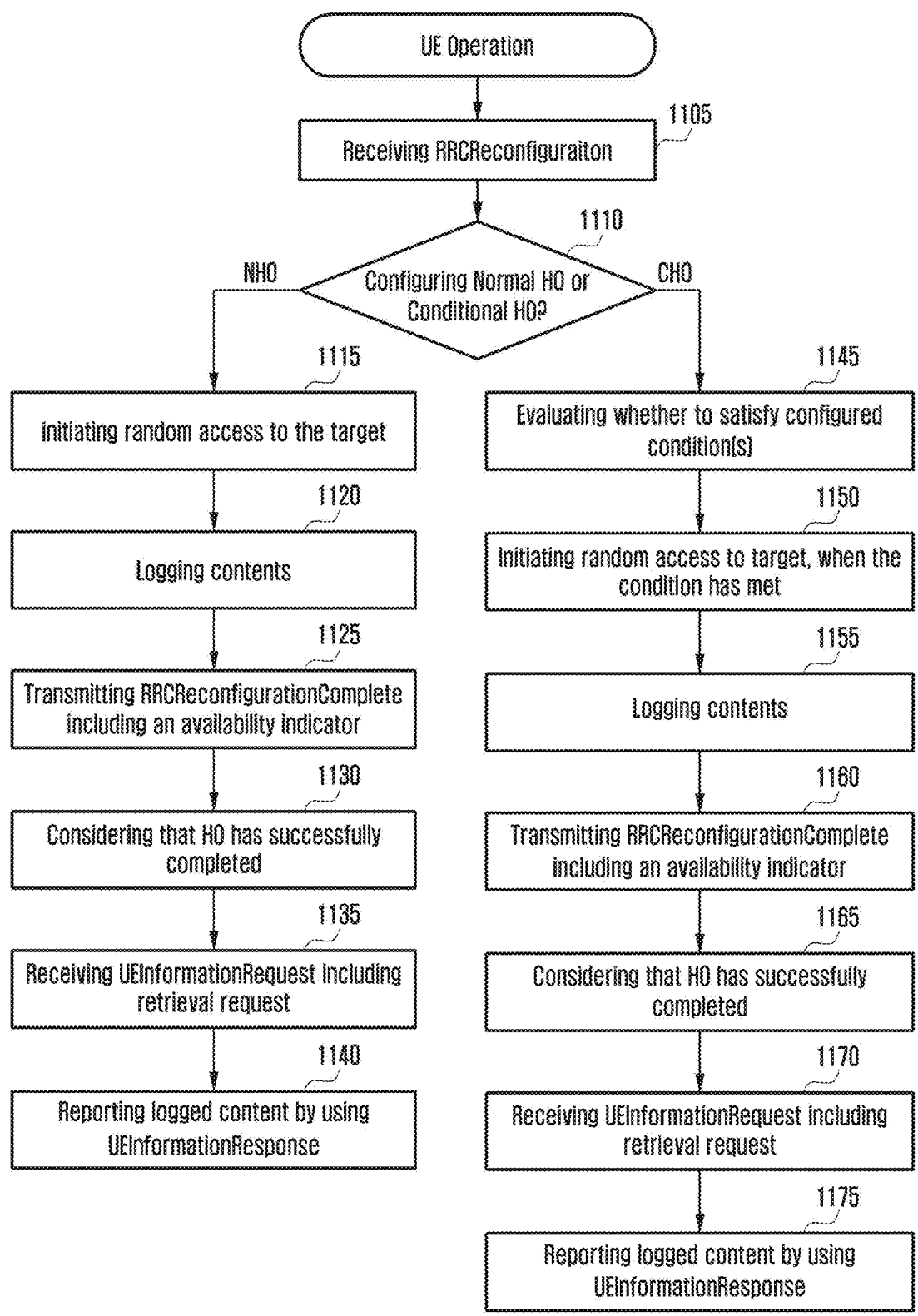
FIG. 11 is a flowchart of a terminal operation of reporting information related to a successfully completed handover to a target cell according to an embodiment of the disclosure.

FIG. 11 is a flowchart of a terminal operation of reporting information related to a successfully completed handover to a target cell according to an embodiment of the disclosure.

In operation 1105, a terminal may receive an RRCReconfiguration message including handover configuration information from a source base station.

In operation 1110, the terminal may determine whether the handover configuration information relates to a normal handover or a condition-based handover.

In operation 1115, when a handover is a normal handover, the terminal may perform a process of random access to the target base station.

In operation 1120, the terminal may store information related to the handover at a predetermined time point.

In operation 1125, the terminal may transmit, to the target base station, an RRCReconfigurationComplete message including an indicator indicating that the information related to the handover is stored in the terminal.

In operation 1130, the terminal may receive feedback information for the message, and consider that the handover has been successfully completed.

In operation 1135, the terminal may receive, from a base station, a request to report the stored successful HO report information.

In operation 1140, the terminal may report the information to the base station.

In operation 1145, when a handover is a condition-based handover, the terminal may evaluate whether conditions corresponding to each candidate target base station are satisfied.

In operation 1150, when at least one condition is satisfied, the terminal may perform a random access process for a target base station corresponding to the condition.

In operation 1155, the terminal may store information related to the handover at a predetermined time point.

In operation 1160, the terminal may transmit, to the target base station, an RRCReconfigurationComplete message including an indicator (availability indicator) indicating that the information related to the handover is stored in the terminal.

In operation 1165, the terminal may receive feedback information for the message, and consider that the handover has been successfully completed.

In operation 1170, the terminal may receive, from a base station, a request (retrieval request) to report the stored successful HO report information.

In operation 1175, the terminal may report the information to the base station.

Figure 12:
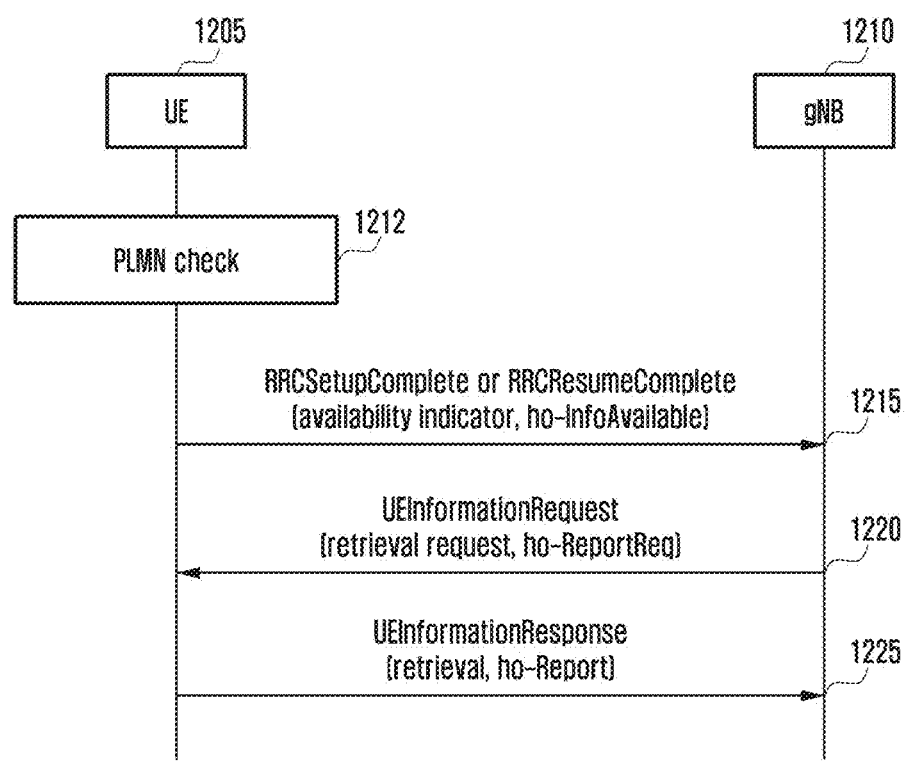
FIG. 12 is a flowchart of a terminal operation of reporting information related to a successfully completed handover to a different cell according to an embodiment of the disclosure.

FIG. 12 is a flowchart of a terminal operation of reporting information related to a successfully completed handover to a different cell or a different base station according to an embodiment of the disclosure.

A target cell may not receive the successful HO report reported thereto due to network congestion, etc. A terminal 1205 may not immediately remove the stored successful HO report and maintain same for a predetermined time. The terminal 1205 may report the information after being connected to a different cell or a different base station 1210. To this end, the terminal may perform a predetermined PLMN identification operation (operation 1212), and then include, in an RRCSetupComplete or RRCResumeComplete message, an indicator indicating that the successful HO report is stored in the terminal (operation 1215). For example, the indicator indicating that the successful HO report is stored in the terminal may be an availability indicator. When the terminal stores a successful HO report, the terminal may store RPLMN or ePLMN information at that time, and when the connected cell supports at least one of the PLMMs (or the current RPLMN coincides with at least one of the stored PLMMs), the terminal may report the indicator to the cell. The connected cell 1210 may request a terminal by using a UEInformationRequest message (operation 1220). The request may be a retrieval request. The terminal 1205 having received the request may report the report to the cell or the base station 1210 by using a UEInformationResponse message (operation 1225).

Figure 13:
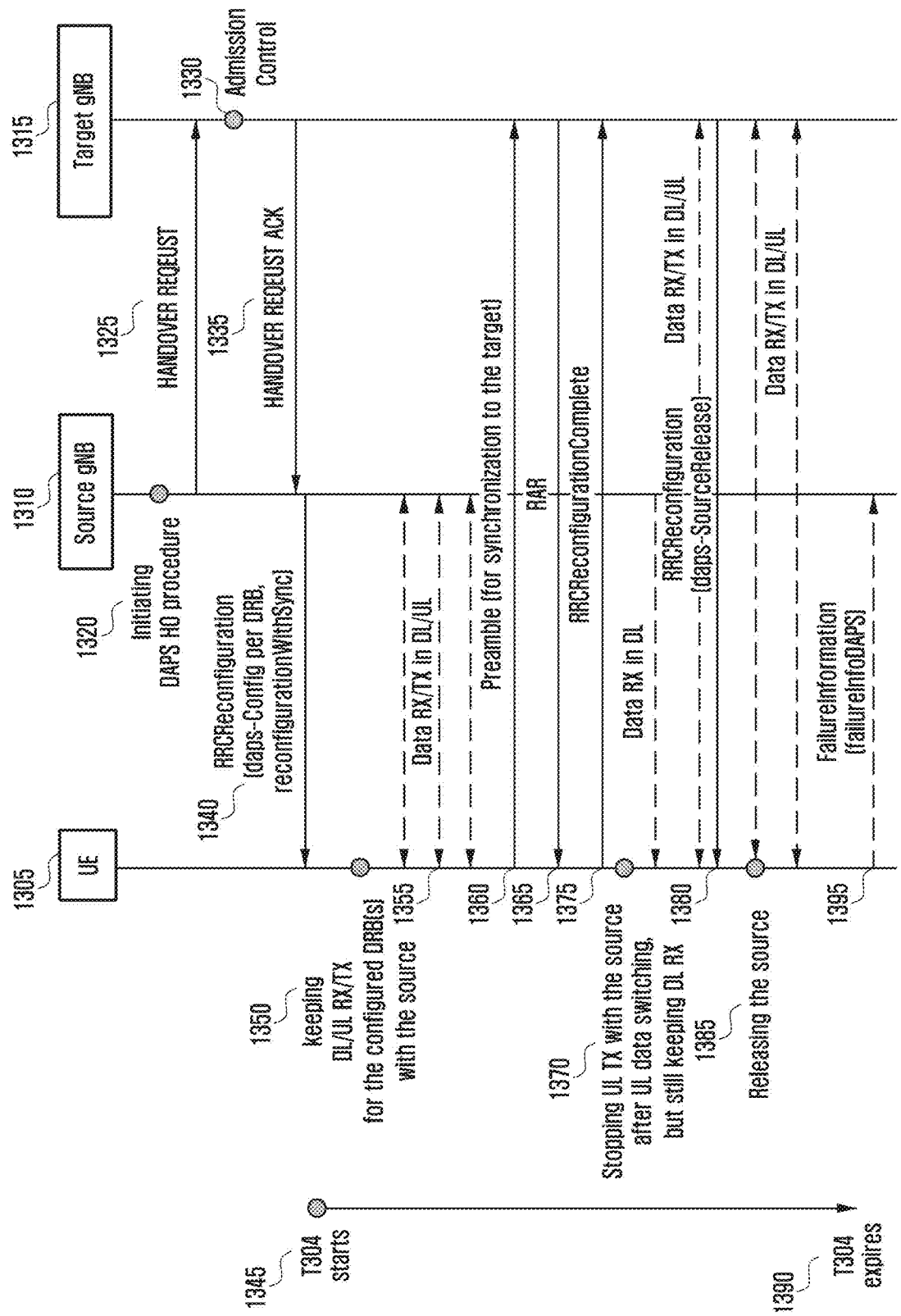
FIG. 13 is a flowchart of a dual active protocol stack (DAPS) handover operation according to an embodiment of the disclosure.

FIG. 13 is a flowchart of a DAPS handover operation according to an embodiment of the disclosure.

A dual active protocol stack (DAPS) handover technique is a technique of maintaining data transmission or reception with a source base station during a handover process in order to minimize service interruption. A terminal is required to process data transmission or reception with source and target base stations at the same time, and thus to support two protocol stacks. A DAPS is configured for each DRB, and when a DAPS is configured for at least one DRB, the DAPS is also applied to an SRB.

When a DAPS handover is determined to be triggered with a source cell or a source base station 1310 (operation 1320), the source cell 1310 may request the normal handover to one target cell or a target base station 1315 through a predetermined inter-node message (operation 1325). The target cell 1315 having received the request may accept the request by using a predetermined admission control (operation 1330), and transmit handover configuration information required for the normal handover operation to the source cell 1310 (operation 1335). The source cell 1310 may accommodate the handover configuration information received from the target cell 1315 in a predetermined RRC message, and transmit the RRC message to the terminal 1305 (operation 1340). The configuration information includes the ID of the target cell, frequency information, configuration information (dedicated preamble information, dedicated radio resource information, etc.) required for an operation of random access to the target cell, transmission power information, and information of a C-RNTI used in the target cell. In addition, DAPS-related configuration information for each DRB may be included.

The terminal 1305 having received the handover configuration information may perform a process of random access to the target cell 1315 and drive a T304 timer (operation 1345). In addition, the terminal 1305 may maintain an operation of data transmission or reception with the source cell 1310 with respect to only an SRB and DRB for which a DAPS is configured (operations 1350 and 1355). The terminal 1305 may transmit the provided preamble to the target cell 1315 (operation 1360). The target cell 1315 having received the preamble may transmit a random access response message (Random Access Response; RAR) to the terminal 1305 (operation 1365). The terminal 1305 may transmit a msg3 to the target cell 1315 by using UL grant information accommodated in the RAR (operation 1375). The msg3 may accommodate an RRCReconfigurationComplete message. When a downlink feedback for the RRCReconfigurationComplete message is received, the terminal may consider that the DAPS handover has been successfully completed, and may stop the T304 timer being operated. A terminal RRC requests a terminal PDCP to perform uplink switching, and from this time point, uplink data is not transmitted to the source base station (operation 1370). However, pieces of control information transmitted by lower layers below a PDCP through uplink are still able to be transmitted to the source base station. In addition, the terminal 1305 may perform an operation of data transmission or reception with the target cell 1315. The target base station 1315 may accommodate a daps-SourceRelease field in RRCReconfiguration and transmit same to the terminal 1305 (operation 1380), and the terminal 1305 having received the message may stop data transmission or reception with the source base station 1310 (operation 1385). When the DAPS handover is not successfully completed until the T304 timer is expired (operation 1390), the terminal 1305 may determine whether RLF has occurred in the source base station 1310. When RLF has not occurred in the source base station 1310, the terminal 1305 may not declare RLF, and continue to perform data transmission or reception with the source base station 1310. Instead, the terminal 1305 may indicate, in a FailureInformation message, that the configured DAPS handover to the target base station 1315 has failed (operation 1395). When RLF has occurred in the source base station 1310, the terminal 1305 may declare RLF, and consider that the handover has failed. After declaring RLF, the terminal 1305 may perform a re-establishment operation. When the RLF is declared, the terminal 1305 may record useful information which may be collected at that time, and when the terminal is connected to one cell later, the terminal may report an RLF report.

Figure 14:
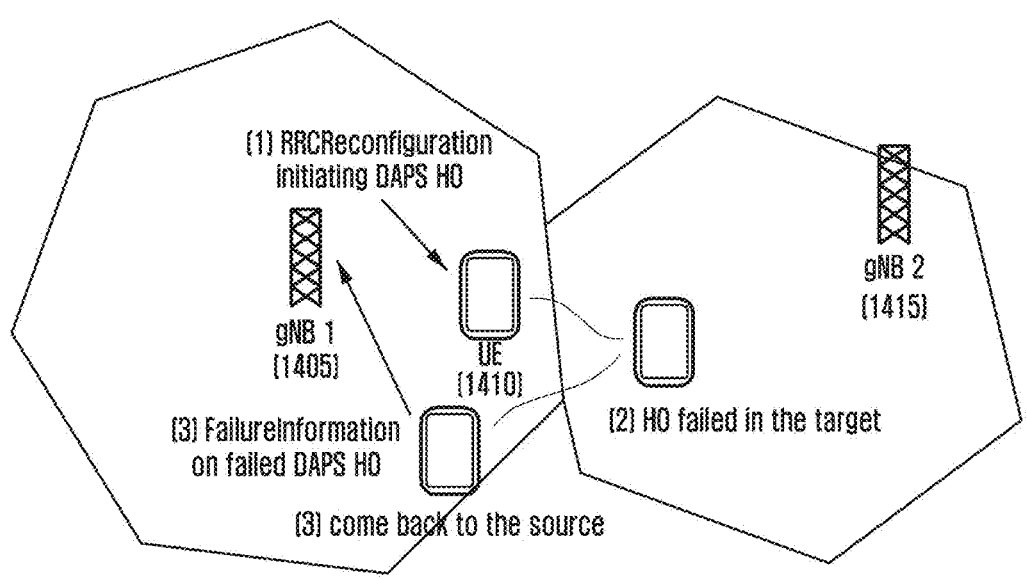
FIG. 14 is a diagram illustrating a process of reporting information related to a failed DAPS handover to a source cell according to an embodiment of the disclosure.

FIG. 14 is a diagram illustrating a process of reporting information related to a failed DAPS handover to a source cell according to an embodiment of the disclosure.

A terminal 1410 may receive DAPS handover configuration information from a source base station 1405. The terminal 1410 has attempted to perform a handover to a target base station 1415, but may fail to successfully complete the handover until a T304 timer is expired. The terminal 1410 may determine whether RLF has occurred in the source base station 1405. When RLF has not occurred in the source base station 1405, this indicates that the terminal 1410 is still able to smoothly perform data transmission or reception with the source base station 1405. Therefore, even though the DAPS handover fails, the terminal 1410 does not declare RLF. The terminal 1410 may include an indicator indicating the DAPS failure in a FailureInformation message, and transmit same to the source base station 1405. In the scenario, RLF is not declared, and thus an RLF report is also not included in the terminal 1410. However, in order to optimize handover performance, when the DAPS handover fails, relevant information is required to be reported to a base station. Therefore, an embodiment proposes a method in which, when a DAPS handover fails, a terminal stores predetermined information and reports same to a source base station or a different base station. Specifically, a terminal accommodates predetermined information related to the failed DAPS handover in a FailureInformation message and reports same, or includes, in a FailureInformation message, an indicator indicating that the predetermined information is stored in the terminal, and reports same. In a case where a FailureInformation message includes an indicator indicating that the predetermined information is stored, a base station having received the indicator may request reporting of the information from the terminal by using a UEInformationRequest message. The terminal having received the request may report the information to the base station by using a UEInformationResponse message.

The predetermined information related to the failed DAPS handover is as follows.

- ID information of a source cell and a target cell. Since a terminal may report the information in a cell other than a source cell and a target cell, the terminal is required to store ID information of a source cell and a target cell involved in a handover operation.
- Signal strength qualities (RSRP, RSRQ, etc.) of a source cell, a target cell, and neighboring cells, which are valid and are collected at a predetermined time point after handover configuration information is received.
- Information of a required time after handover configuration information is received, and information of a required time after a handover fails.
- Terminal position information and time information at a predetermined time point after handover configuration information is received. For example, the predetermined time point indicates a time point at which a preamble is transmitted, a time point at which an RRCReconfigurationComplete message is transmitted to a target cell, or a time point when an RRCReconfiguration message including a daps-SourceRelease field is received from a target cell.
- Random access-related information related to a random access which has been performed during a handover operation.—For example, the random access-related information may be index information of a CSI-RS or an SSB having been used to perform a random access, the number of transmissions of a preamble in each SSB or CSI-RS, whether contention has occurred, an indicator indicating whether the signal strength quality of an SSB or CSI-RS is better than a predetermined RSRP threshold value, and information on a wireless resource which has been used for preamble transmission.
- Maximum terminal transmission power available in a source cell and a target cell, uplinkPowerSharingDAPS-Mode field information, and the number of DRBs for which DAPS is configured.

Figure 15:
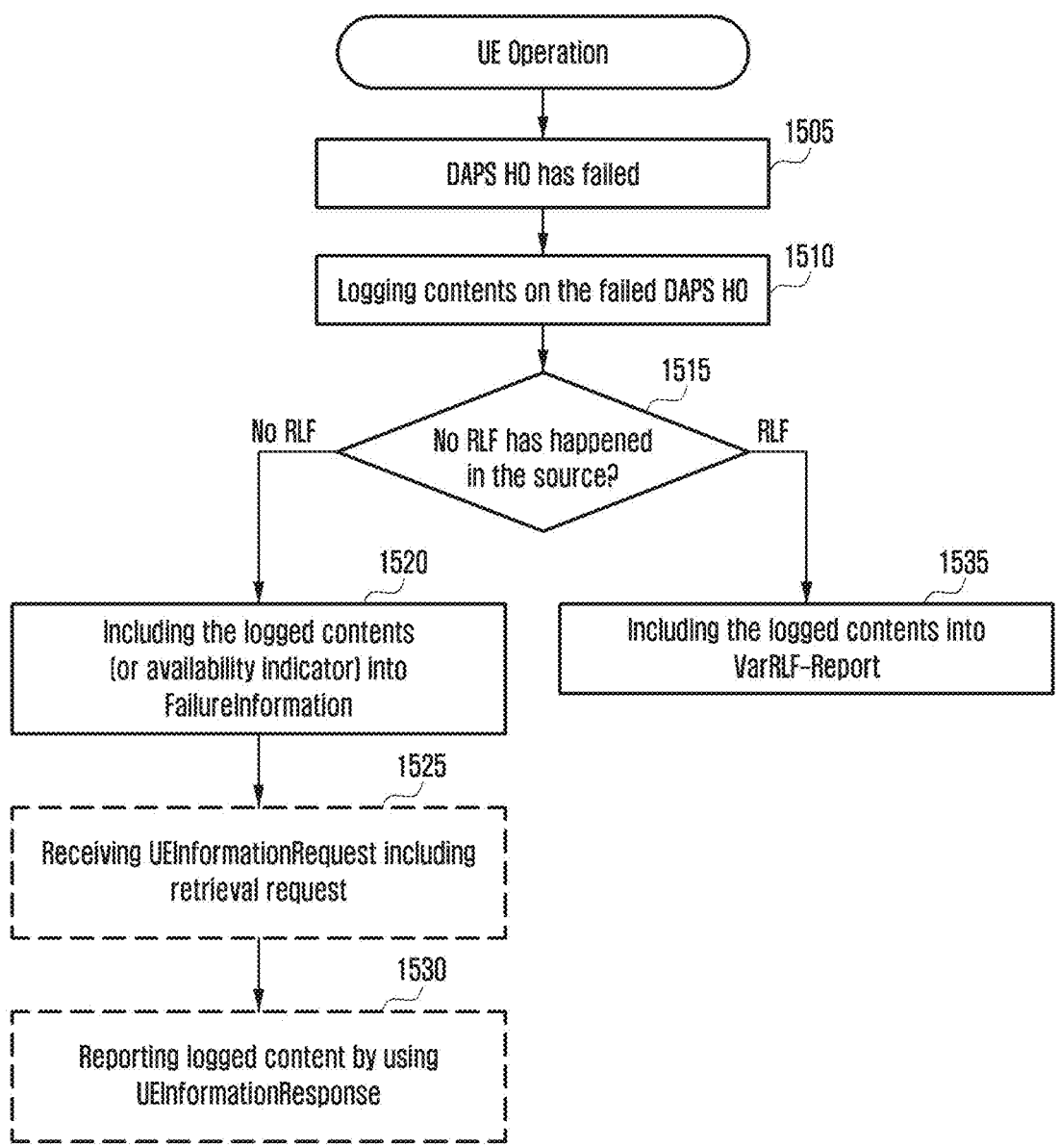
FIG. 15 is a flowchart of a terminal operation of reporting information related to a failed DAPS handover to a source cell according to an embodiment of the disclosure.

FIG. 15 is a flowchart of a terminal operation of reporting information related to a failed DAPS handover to a source cell according to an embodiment of the disclosure.

In operation 1505, a terminal may recognize that a DAPS handover to a target base station has failed.

In operation 1510, the terminal may store valid information when the handover fails.

In operation 1515, the terminal may determine whether RLF has occurred in the source base station.

In operation 1520, when RLF has not occurred in the source base station, the terminal may accommodate the stored information in a FailureInformation message and transmit same to the source base station. Alternatively, the terminal may accommodate, in a FailureInformation message, an indicator indicating that the information is stored in the terminal and transmit same to the source base station.

In operation 1525, in a case where the terminal accommodates, in a FailureInformation message, an indicator indicating that the information is stored in the terminal and reports same, the terminal may receive, from the source base station, a UEInformationRequest message including an indicator requesting reporting of the information.

In operation 1530, the terminal may report the information to the source base station by using a UEInformationRequest message.

In operation 1535, when RLF has occurred in the source base station, the terminal may store the stored information in VarRLF-Report that is a terminal internal variable. The information may be reported as an RLF report to a base station connected later.

Figure 16:
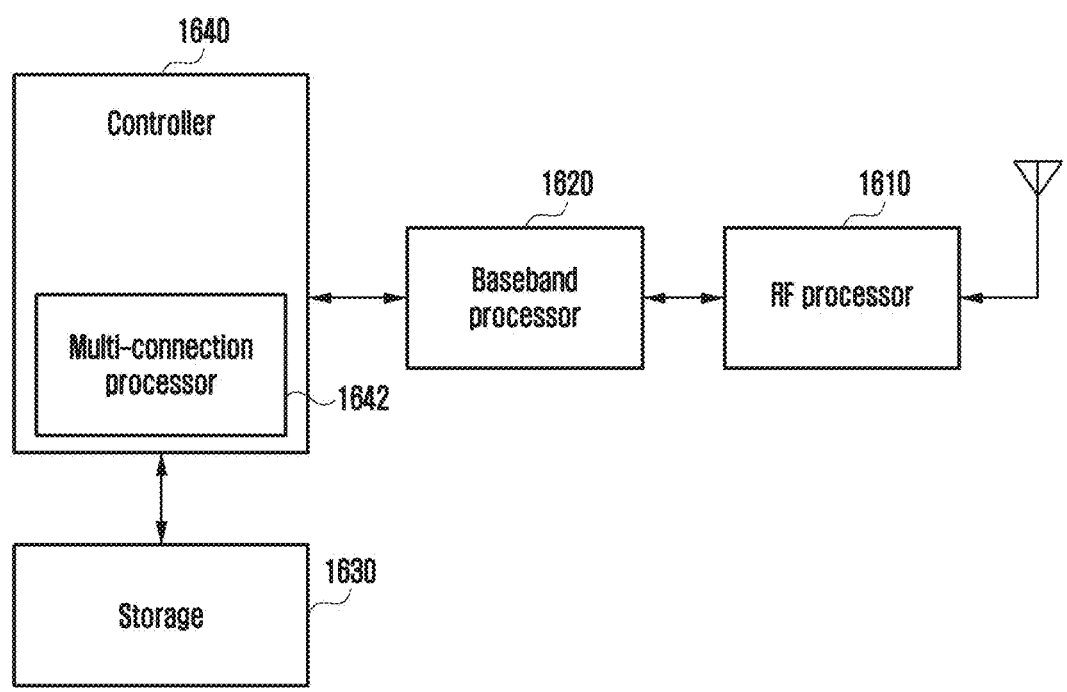
FIG. 16 is a block diagram illustrating an internal structure of a terminal employing the disclosure.

FIG. 16 is a block diagram illustrating an internal structure of a terminal employing the disclosure.

Referring to the diagram, the terminal may include a radio frequency (RF) processor 1610, a baseband processor 1620, a storage 1630, and a controller 1640.

The RF processor 1610 may perform a function, such as signal band change, amplification, etc., for transmitting or receiving a signal through a wireless channel. That is, the RF processor 1610 may upconvert a baseband signal provided from the baseband processor 1620, into an RF band signal, and then transmit the RF band signal through an antenna, and may downconvert an RF band signal received through the antenna, into a baseband signal. For example, the RF processor 1610 may include a transmission filter, a reception filter, an amplifier, a mixer, an oscillator, a digital-to-analog converter (DAC), an analog-to-digital converter (ADC), and the like. In the diagram, only one antenna is illustrated, but the terminal may include a plurality of antennas. In addition, the RF processor 1610 may include a plurality of RF chains. Furthermore, the RF processor 1610 may perform beamforming. To perform the beamforming, the RF processor 1610 may adjust the phase and size of each of signals transmitted or received through a plurality of antennas or antenna elements. In addition, the RF processor may perform MIMO, and may receive several layers when a MIMO operation is performed.

The baseband processor 1620 may perform a function of conversion between a baseband signal and a bitstream according to a physical layer standard of a system. For example, when data is transmitted, the baseband processor 1620 may generate complex symbols by encoding and modulating a transmission bitstream. In addition, when data is received, the baseband processor 1620 reconstructs a reception bit stream by demodulating and decoding a baseband signal provided from the RF processor 1610. For example, in a case where an orthogonal frequency division multiplexing (OFDM) scheme is applied, when data is transmitted, the baseband processor 1620 may generate complex symbols by encoding and modulating a transmission bitstream, map the complex symbols to subcarriers, and then configure OFDM symbols through inverse fast Fourier transform (IFFT) calculation and cyclic prefix (CP) insertion. In addition, when data is received, the baseband processor 1620 may divide a baseband signal provided from the RF processor 1610, by the units of OFDM symbols, reconstruct signals mapped to subcarriers, through fast Fourier transform (FFT) calculation, and then reconstruct a reception bit stream through demodulation and decoding.

The baseband processor 1620 and the RF processor 1610 may transmit and receive a signal as described above. Accordingly, the baseband processor 1620 and the RF processor 1610 may be called a transmitter, a receiver, a transceiver, or a communicator. Furthermore, at least one of the baseband processor 1620 and the RF processor 1610 may include a plurality of communication modules to support a plurality of different wireless access techniques. In addition, at least one of the baseband processor 1620 and the RF processor 1610 may include different communication modules to process signals in different frequency bands. For example, the different wireless access techniques may include wireless LAN (e.g., IEEE 802.11), a cellular network (e.g., LTE), etc. Furthermore, the different frequency bands may include a super high frequency (SHF) (e.g., 2.NRHz, NRhz) band, a millimeter (mm) wave (e.g., 60 GHz) band, etc.

The storage 1630 may store data such as a basic program, an application program, and configuration information for an operation of the terminal. Particularly, the storage 1630 may store information related to a second access node that performs wireless communication by using a second wireless access technique. The storage 1630 may provide stored data in response to a request of the controller 1640.

The controller 1640 may control overall operations of the terminal. For example, the controller 1640 may transmit or receive a signal via the baseband processor 1620 and the RF processor 1610. In addition, the controller 1640 records and reads data in and from the storage 1640. To this end, the controller 1640 may include at least one processor. For example, the controller 1640 may include a communication processor (CP) performing a control for communication, and an application processor (AP) controlling a higher layer, such as an application program.

According to an embodiment of the disclosure, the controller 1640 may be configured to control the transceiver to receive a first message including handover configuration information for a handover from a first base station, store information related to the handover at a first time point, transmit, to a second base station, a second message including an indicator indicating that the information related to the handover is stored in the terminal, identify whether a third message including a request for the information related to the handover is received from the second base station, and control the transceiver to transmit a fourth message including the information related to the handover, based on the request when the third message is received.

In a case where the first base station is a source base station, the second base station is a target base station, and the second message is transmitted to the target base station, when the third message including the request for the information related to the handover is not received from the target base station, the information related to the handover may be removed.

In a case where the first base station is a source base station, the second base station is a target base station, and the second message is transmitted to the target base station, when the third message including the request for the information related to the handover is not received from the target base station, the information related to the handover may be transmitted to a third base station at the time of occurrence of a pre-configured event, wherein the pre-configured event includes at least one of operations of performing setup, resume of connection, handover, or re-establishment of connection for the third base station.

The information related to the handover may include, at least one of source base station identification information, target base station identification information, signal strength quality information for at least one base station, location information of the terminal at a random time point, time information, information of a required time after the first message is received, and information related to a random access performed during operation of the handover.

The information related to the handover may include, when the handover is a conditional handover (CHO), at least one of information of a condition triggering the handover, signal strength quality information for a source base station, a target base station, and a neighboring base station when the handover is executed according to the condition, identification information of a target base station failing in a first CHO handover in a case where a second CHO handover is performed for a candidate target base station discovered after the failure of the first CHO handover and is successful, and indication information indicating whether to allow the second CHO handover.

The information related to the handover may include, when the handover is a dual active protocol stack (DAPS) handover, at least one of maximum terminal transmission power available in the source base station and the target base station, information about an uplink power sharing DAPS mode, and information of the number of DRBs for which a DAPS is configured.

The first time point may include a time point of transmitting a first preamble to a target base station after successful completion of the handover, a time point of transmitting an RRC reconfiguration complete message to the target base station, and a time point at which the RRC reconfiguration complete message is successfully transmitted to the target base station, and in a case where the handover is a DAPS handover, the first time point may include a time point of receiving an RRC reconfiguration message including a daps-sourcerelease field from the target base station, a time point of switching an uplink to the target base station, a time point of transmitting the RRC reconfiguration complete message to the target base station, and a time point at which the RRC reconfiguration complete message is successfully transmitted to the target base station.

The controller 1640 may be configured to control the transceiver to transmit a failure information message including an indicator indicating DAPS failure to the first base station in a case where the handover configuration information is configuration information on a DAPS handover and the terminal has failed to success a handover to the second base station until a timer expiration time point.

Information on failure of the DAPS handover may be transmitted together with the indicator, or information indicating that information on failure of the DAPS handover exists in the terminal may be transmitted together with the indicator.

The controller 1640 may be configured to control the transceiver to transmit the information on failure of the DAPS handover to the first base station when a request message requesting the information indicating that the information on failure of the DAPS handover exists in the terminal is received from the first base station in a case where the information is transmitted together with the indicator.

Figure 17:
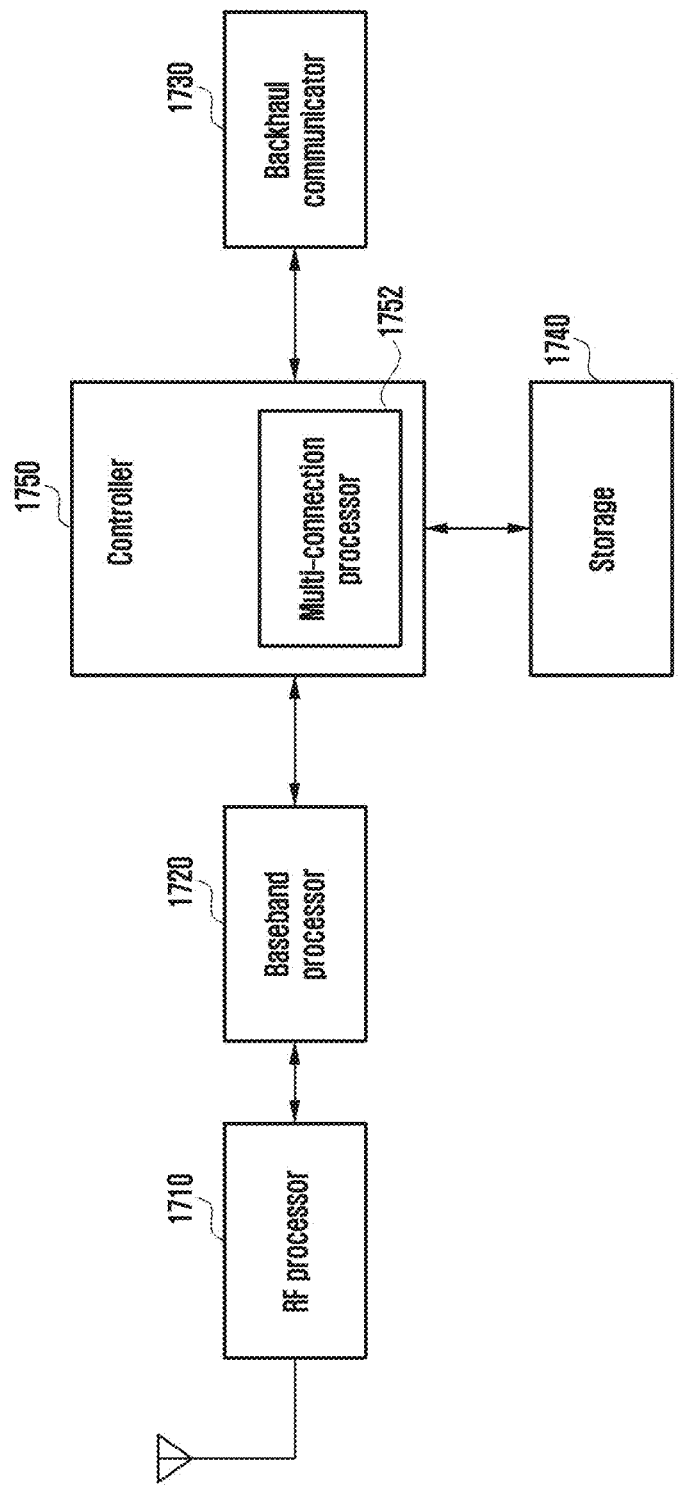
FIG. 17 is a block diagram illustrating a configuration of a base station according to the disclosure.

FIG. 17 is a block diagram illustrating a configuration of a base station according to the disclosure. The base station may be operated as a source base station or target base station for a terminal according to an embodiment of the disclosure.

As illustrated in the diagram, the base station includes an RF processor 1710, a baseband processor 1720, a backhaul communicator 1730, a storage 1740, and a controller 1750.

The RF processor 1710 may perform a function, such as signal band change, amplification, etc., for transmitting or receiving a signal through a wireless channel. For example, the RF processor 1710 may upconvert a baseband signal provided from the baseband processor 1720, into an RF band signal, and then transmit the RF band signal through an antenna, and may downconvert an RF band signal received through the antenna, into a baseband signal. For example, the RF processor 1710 may include a transmission filter, a reception filter, an amplifier, a mixer, an oscillator, a DAC, an ADC, and the like. In the diagram, only one antenna is illustrated, but the first access node may include a plurality of antennas. In addition, the RF processor 1710 may include a plurality of RF chains. Furthermore, the RF processor 1710 may perform beamforming. To perform the beamforming, the RF processor 1710 may adjust the phase and size of each of signals transmitted or received via a plurality of antennas or antenna elements. The RF processor may perform a downlink MIMO operation by transmitting one or more layers.

The baseband processor 1720 performs a function of conversion between a baseband signal and a bit stream according to a physical layer standard of a first wireless access technique. For example, when data is transmitted, the baseband processor 1720 may generate complex symbols by encoding and modulating a transmission bitstream. In addition, when data is received, the baseband processor 1720 reconstructs a reception bit stream by demodulating and decoding a baseband signal provided from the RF processor 1710. For example, in a case where an OFDM scheme is applied, when data is transmitted, the baseband processor 1720 may generate complex symbols by encoding and modulating a transmission bitstream, map the complex symbols to subcarriers, and then configure OFDM symbols through IFFT calculation and CP insertion. In addition, when data is received, the baseband processor 1720 may divide a baseband signal provided from the RF processor 1710, by the units of OFDM symbols, reconstruct signals mapped to subcarriers, through FFT, and then reconstruct a reception bit stream through demodulation and decoding. The baseband processor 1720 and the RF processor 1710 may transmit and receive a signal as described above. Accordingly, the baseband processor 1720 and the RF processor 1710 may be called a transmitter, a receiver, a transceiver, a communicator, or a wireless communicator.

The backhaul communicator 1730 may provide an interface for performing communication with other nodes within a network. For example, the backhaul communicator 1730 converts, into a physical signal, a bitstream transmitted from the main base station to a different node, for example, an auxiliary base station, a core network, etc., and converts a physical signal received from the other node, into a bitstream.

The storage 1740 may store data such as a basic program, an application program, and configuration information for an operation of the main base station. For example, the storage 1740 may store information on a bearer assigned to a connected terminal, a measurement result reported from a connected terminal, etc. In addition, the storage 1740 may store information serving as a determination criterion of whether to provide or stop providing multi-connection to a terminal. The storage 1740 may provide stored data in response to a request of the controller 1750.

The controller 1750 may control overall operations of the main base station. For example, the controller 1750 may transmit or receive a signal via the baseband processor 1720 and the RF processor 1710, or via the backhaul communicator 1730. In addition, the controller 1750 records and reads data in and from the storage 1740. To this end, the controller 1750 may include at least one processor.

Second Embodiment

In the following description, a term for identifying an access node, terms for indicating network entities, terms for indicating messages, a term for indicating an interface between network entities, terms for indicating various identification information, and the like are examples for convenience of explanation. Therefore, the disclosure may not be limited by the terminologies provided below, and other terms that indicate objects having equivalent technical meanings may be used.

For convenience of description, terms and names defined in 3rd generation partnership project long-term evolution (3GPP LTE) standards will be used in the disclosure. However, the disclosure is not limited to the terms and names, and may be applied to a system following other standards in the same way. In the disclosure, an eNB may be used together with a gNB for convenience of explanation. For example, a base station described as an eNB may indicate a gNB. In addition, the term "terminal" may indicate other wireless communication devices as well as a mobile phone, NB-IoT devices, and sensors.

Hereinafter, a base station is a subject configured to perform resource allocation to a terminal, and may be at least one of a gNode B, an eNode B, a Node B, a base station (BS), a wireless access unit, a base station controller, or a node on a network. A terminal may include a user equipment (UE), a mobile station (MS), a cellular phone, a smartphone, a computer, or a multimedia system capable of a communication function. However, the disclosure is not limited to the above example.

The disclosure may be applied to 3GPP NR (5th generation mobile communication standard). In addition, the disclosure may be applied to intelligent services (e.g., smart homes, smart buildings, smart cities, smart cars or connected cars, health care, digital education, retail businesses, security and safety related services, and the like), based on 5G communication technologies and IoT-related technologies. In the disclosure, an eNB may be used together with a gNB for convenience of explanation. For example, a base station described as an eNB may indicate a gNB. In addition, the term "terminal" may indicate other wireless communication devices as well as a mobile phone, NB-IoT devices, and sensors.

Wireless communication systems have developed beyond voice-based service provided at the initial stage, into broadband wireless communication systems that provide a high speed and high quality packet data service including communication standards, such as high speed packet access (HSPA), long-term evolution (LTE or evolved universal terrestrial radio access (E-UTRA)), LTE-advanced (LTE-A), and LTE-Pro related to 3GPP, high rate packet data (HRPD) and ultra-mobile broadband (UMB) related to 3GPP2, 802.16e related to IEEE, and the like.

An LTE system, which is a representative example of the broadband wireless communication system, employs an orthogonal frequency division multiplexing (OFDM) scheme for downlink (DL), and employs a single carrier frequency division multiple access (SC-FDMA) scheme for uplink (UL). Uplink denotes a wireless link for transmitting data or a control signal by a terminal (user equipment (UE) or mobile station (MS)) to a base station (eNode B or base station (BS)), and downlink denotes a wireless link for transmitting data or a control signal by a base station to a terminal. In the multiple access schemes described above, time-frequency resources for carrying data or control information are allocated and managed in a manner to prevent overlapping of the resources between users, i.e., to establish the orthogonality, so as to identify data or control information of each user.

A future communication system after LTE, that is, a 5G communication system, is required to freely apply various requirements from a user, a service provider, and the like, and thus support a service satisfying all the various requirements. Services considered for 5G communication systems may include enhanced mobile broadband (eMBB), massive machine type communication (mMTC), ultra-reliable low-latency communication (URLLC), etc.

In addition, hereinafter, an embodiment of the disclosure will be described based on an example of an LTE, LTE-A, LTE Pro, or 5G (or NR, next generation mobile communication) system, but an embodiment of the disclosure may be also applied to another communication system having a similar technical background or channel type. In addition, an embodiment of the disclosure may be also applied to another communication system through partial modification without departing too far from the scope of the disclosure according to the determination of a person skilled in the art.

In describing the disclosure below, a detailed description of related known configurations or functions incorporated herein will be omitted when it is determined that the detailed description thereof may unnecessarily obscure the subject matter of the disclosure. Hereinafter, an embodiment of the disclosure will be described with reference to the accompanying drawings.

Figure 18:
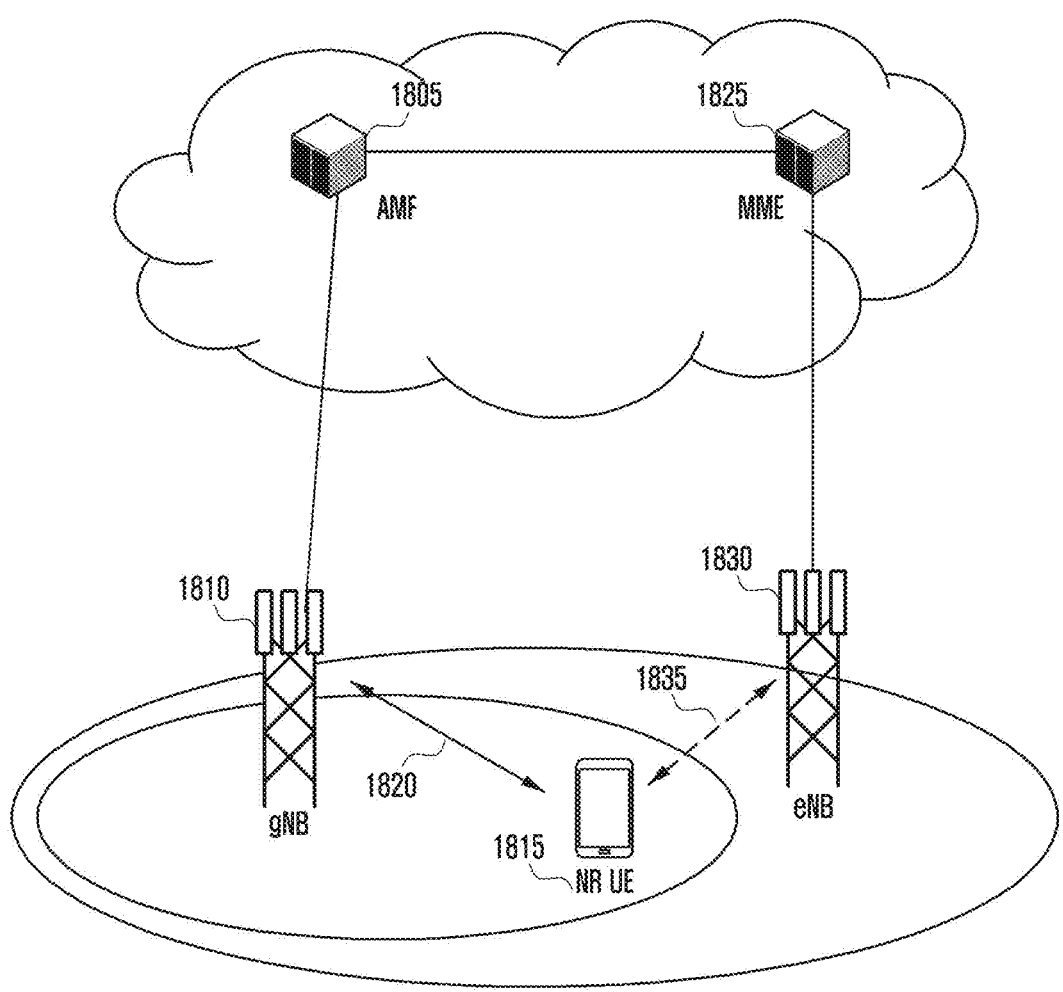
FIG. 18 is a diagram illustrating a structure of a next generation mobile communication system according to an embodiment of the disclosure.

FIG. 18 is a diagram illustrating a structure of a next generation mobile communication system according to an embodiment of the disclosure.

Referring to FIG. 18, a wireless access network of a next generation mobile communication system (new radio; NR) may be configured by a next generation base station (new radio node B, hereinafter, gNB) 1810 and a wireless core network (new radio core network). A wireless core network may include an access management function (AMF) 1805, and is not limited to the above example. A user terminal (new radio user equipment, hereinafter, an NR UE or terminal) 115 may access an external network via the gNB 1810 and the AMF 1805.

In FIG. 18, the gNB 1810 may correspond to an evolved node B (eNB) of a conventional LTE system. The gNB 1810 may be connected to the NR UE 1815 through a wireless channel and may provide, to the NR UE 1815, a further outstanding service compared to a conventional node B (as indicated by reference numeral 1820). In a next generation mobile communication system, all the user traffic is serviced thorough shared channels. Therefore, the next generation mobile communication system requires a device which collects pieces of state information including a buffer state, an available transmission power state, and a channel state of UEs and performs scheduling, and the gNB 1810 may serve as the device. The one gNB 1810 may normally control multiple cells. In order to implement ultra-high-speed data transfer compared to conventional LTE, the conventional maximum bandwidth or wider may be employed, and a beamforming technique may be additionally used with an orthogonal frequency division multiplexing (hereinafter, referred to as OFDM) provided as a wireless access technique.

In addition, according to an embodiment, the NR gNB 1810 may apply an adaptive modulation and coding (hereinafter, referred to as AMC) scheme for determining a modulation scheme and a channel coding rate according to a channel state of a terminal. The AMF 1805 may perform functions such as mobility support, bearer configuration, and QoS configuration. The AMF 1805 is a device that performs various control functions as well as a mobility management function for a terminal, and may be connected to a plurality of base stations. In addition, the next generation mobile communication system may also be linked to an existing LTE system, and the AMF 1805 is connected to a mobility management entity (MME) 1825 via a network interface. The MME 1825 may be connected to an eNB 1830 that is a conventional base station. A terminal supporting LTE-NR dual connectivity may transmit or receive data while maintaining a connection with the eNB 1830 as well as the gNB 1810 (as indicated by reference numeral 1835).

Figure 19:
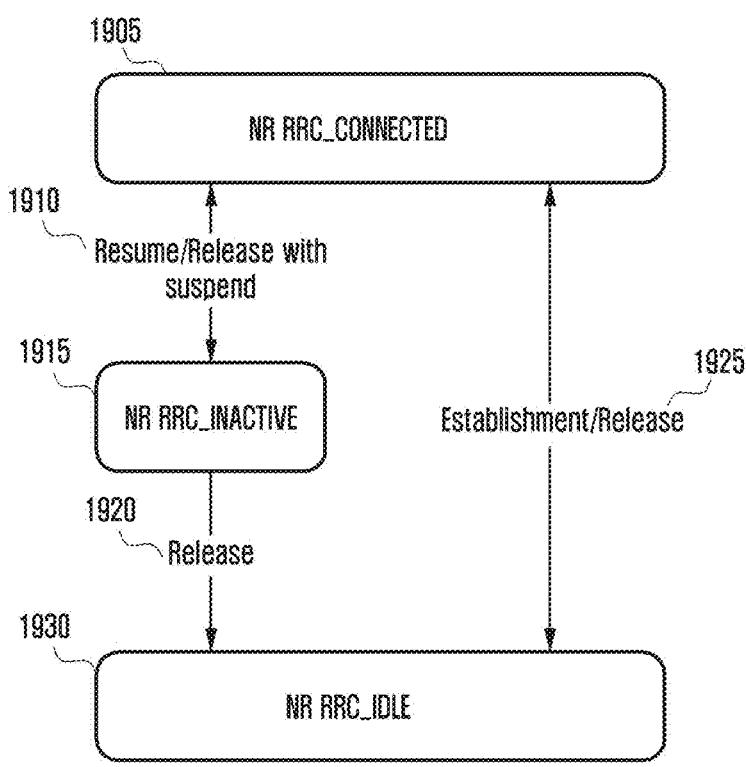
FIG. 19 is a diagram illustrating a transition of a wireless access state in a next generation mobile communication system according to an embodiment of the disclosure.

FIG. 19 is a diagram illustrating a transition of a wireless access state in a next generation mobile communication system according to an embodiment of the disclosure.

A next generation mobile communication system have three wireless access states (radio resource control (RRC) states). A connection mode (RRC_CONNECTED) 1905 may indicate a wireless access state in which a terminal is able to transmit or receive data. A standby mode (RRC_IDLE) 1930 may indicate a wireless access state in which a terminal monitors whether paging is transmitted to the terminal. The connection mode 1905 and the standby mode 1930 are wireless access states also applied to a conventional LTE system, and a detailed technique thereof is the same as that of a conventional LTE system. In a next generation mobile communication system, an inactive (RRC_INACTIVE) wireless access state 1915 is newly defined. In the disclosure, the RRC_INACTIVE wireless access state 1915 newly defined in the next generation mobile communication system may correspond to an inactive wireless access state, an INACTIVE mode, etc.

In the wireless access state of the inactive mode 1915, UE context may be maintained at a base station and a terminal, and radio access network (RAN)-based paging may be supported. The features of the new wireless access state are as follows.

Cell re-selection mobility;
CN-NR RAN connection (both C/U-planes) has been established for UE;
The UE AS context is stored in at least one gNB and the UE;
Paging is initiated by NR RAN;
RAN-based notification area is managed by NR RAN;
NR RAN knows the RAN-based notification area which the UE belongs to;

According to an embodiment, the INACTIVE wireless access state may transition to the connection mode 1905 or the standby mode 1930 through a particular procedure. For example, the INACTIVE mode 1915 may be switched to the connection mode 1905 according to a Resume process, and the connection mode 1905 may be switched to the INACTIVE mode 1915 through a Release procedure including suspend configuration information (a procedure 1910). In the described procedure 1910, one or more RRC messages may be transmitted or received between a terminal and a base station, and the described procedure 1910 may include one or more stages. In addition, through a Release procedure after Resume, the INACTIVE mode 1915 may be switched to the standby mode 1930 (as indicated by reference numeral 1920).

Switching between the connection mode 1905 and the standby mode 1930 may be performed according to a conventional LTE technology. For example, switching between the connection mode 1905 and the standby mode 1930 may be accomplished through an establishment or release procedure (as indicated by reference numeral 1925).

Figure 20:
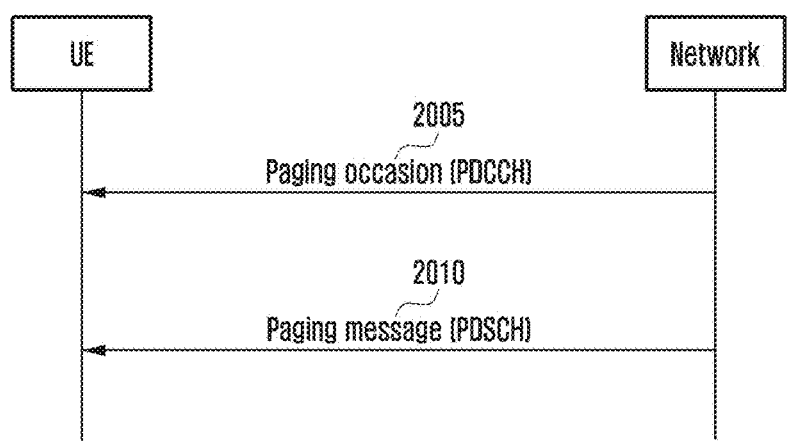
FIG. 20 is a diagram illustrating a procedure in which a base station (or network) broadcasts a paging occasion and a paging message.

FIG. 20 is a diagram illustrating a procedure in which a base station (or network) broadcasts a paging occasion and a paging message.

A 5G or next generation radio access network (NG-LAN) based on NR is configured by NG-LAN nodes, and the NG-LAN node may indicate a gNB. The gNB may provide NR user plane and control plane protocol termination to a UE. In addition, the gNB are connected via an NG interface for a 5GC and, more specifically, may be connected to an access and mobility management function (AMF) according to an NG-C interface and a user plane function (UPF) according to an NG-U interface. In a 5G (also referred to as NR or new radio) wireless communication system, a terminal may use discontinuous reception (or DRX) in order to reduce power consumption in an RRC_IDLE or RRC_INACTIVE mode. A UE being in an RRC_IDLE/RRC_INACTIVE state may not monitor a physical downlink control channel (PDCCH), and may regularly (e.g., every DRX cycle) monitor a PDCCH only for a short time for paging reception 2005, SI update notification reception, and urgent notification reception. A paging message 2010 may be transmitted using a physical downlink shared channel (or PDSCH). When a paging message is in a PDSCH, a PDCCH is marked with a P-RNTI. A P-RNTI may be common for all UEs. A UE identity (e.g., an S-TMSI for an RRC_IDLE UE or an I-RNTI for an RRC_INACTIVE UE) may be included in a paging message to represent paging for a particular UE. A paging message may include multiple UE identities to perform paging of multiple UEs. A paging message may be broadcast through a data channel (e.g., PDSCH) (e.g., a PDCCH is masked with a P-RNTI). System information (SI) update and emergency notification may be included in DCI, and a PDCH carrying the DCI may be marked with a P-RNTI. In an RRC_IDLE/RRC_INACTIVE mode, a UE may monitor one paging occasion (PO) 2005 every DRX cycle. In an RRC_IDLE/RRC_INACTIVE mode, a UE may monitor a PO within an initial downlink bandwidth part (DL BWP). In an RRC connection state, a UE may monitor one or more POs to receive an SI update notification and receive an urgent notification. A UE may monitor all POs in a paging DRX cycle, and monitor at least one PO in an SI modification period. In an RRC_IDLE/RRC_INACTIVE mode, a UE may monitor a PO within an active DL BWP. A PO is a set of S number of PDCH monitoring occasions for paging, and "S" may indicate the number of synchronization signal and PBCH blocks (SSBs) transmitted from a cell. A UE may determine a paging frame (PF) first, and then determine a PO for the determined PF. One PF is a radio frame (10 ms). A scheme of determination of a PF and PO follows the description below.

The PF for a UE is the radio frame with system frame number 'SFN' which satisfies the equation (SFN+PF_offset) mod T=(T div N)*(UE_ID mod N).

Index (i_s), indicating the index of the PO is determined by i_s=floor(UE_ID/N) mod Ns.

T is DRX cycle of the UE.

In RRC_INACTIVE state, T is determined by the shortest of the UE specific DRX value configured by RRC, UE specific DRX value configured by NAS, and a default DRX value broadcast in system information.

In RRC_IDLE state, T is determined by the shortest of UE specific DRX value configured by NAS, and a default DRX value broadcast in system information. If UE specific DRX is not configured by upper layers (i.e., NAS), the default value is applied.

N: number of total paging frames in T

Ns: number of paging occasions for a PF

PF_offset: offset used for PF determination

UE_ID: 5G-S-TMSI mod 1024

Parameters Ns, nAndPagingFrameOffset, and the length of default DRX Cycle are signaled in SIB1. The values of N and PF_offset are derived from the parameter nAndPagingFrameOffset as defined in TS 38.331. If the UE has no 5G-S-TMSI, for instance when the UE has not yet registered onto the network, the UE shall use as default identity UE_ID=0 in the PF and i_s formulas above.

The PDCCH monitoring occasions for paging are determined based on paging search space configuration (paging-SearchSpace) signaled by gNB.

When SearchSpaceId=0 is configured for paging-SearchSpace, the PDCCH monitoring occasions for paging are same as for RMSI as defined in clause 13 in TS 38.213. When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the (i_s+1)th PO. The PDCCH monitoring occasions for paging are determined based on paging search space configuration (paging-SearchSpace) signaled by gNB. The PDCCH monitoring occasions for paging which are not overlapping with UL symbols (determined according to tdd-UL-DL-ConfigurationCommon) are sequentially numbered from zero starting from the 1st PDCCH monitoring occasion for paging in the PF. The gNB may signal parameter firstPDCCH-MonitoringOccasionOfPO for each PO corresponding to a PF. When firstPDCCH-MonitoringOccasionOfPO is signalled, the (i_s+1)th PO is a set of 'S' consecutive PDCCH monitoring occasions for paging starting from the PDCCH monitoring occasion number indicated by firstPDCCH-MonitoringOccasionOfPO (i.e., the (i_s+1)th value of the firstPDCCH-MonitoringOccasionOfPO parameter). Otherwise, the (i_s+1)th PO is a set of 'S' consecutive PDCCH monitoring occasions for paging starting from the (i_s*S)th PDCCH monitoring occasion for paging. 'S' is the number of actual transmitted SSBs determined according to parameter ssb-PositionsInBurst signalled in SystemInformationBlock1 received from gNB. The parameter first-PDCCH-MonitoringOccasionOfPO is signalled in SIB1 for paging in initial DL BWP. For paging in a DL BWP other than the initial DL BWP, the parameter first-PDCCH-MonitoringOccasionOfPO is signaled in the corresponding BWP configuration.

A PDCCH marked with a P-RNTI may delivery information according to DCI format 1_0. The following information may indicate information delivered in DCI format 1_0 by using a CRC scrambled by a P-RNTI.

Short Messages Indicator—2 bits according to Table 2.

Short Messages—8 bits according to Table 3. If only the scheduling information for Paging is carried, this bit field is reserved.

Frequency domain resource assignment—$\lceil \log_2(N_{RB}^{DL,BWP}(N_{RB}^{DL,BWP}+1)/2) \rceil$ bits. If only the short message is carried, this bit field is reserved.

$N_{RB}^{DL,BWP}$ is the size of CORESET 0

Time domain resource assignment—4 bits as defined in Subclause 5.1.2.1 of [6, TS38.214]. If only the short message is carried, this bit field is reserved.

VRB-to-PRB mapping—1 bit according to Table 7.3.1.1.2-33. If only the short message is carried, this bit field is reserved.

Modulation and coding scheme—5 bits as defined in Subclause 5.1.3 of [6, TS38.214], using Table 5.1.3.1-1. If only the short message is carried, this bit field is reserved.

TB scaling—2 bits as defined in Subclause 5.1.3.2 of [6, TS38.214]. If only the short message is carried, this bit field is reserved.

Reserved bits—6 bits

Table 2 below shows a short message indicator.

TABLE 2

| Bit field | Short Message indicator |
|---|---|
| 00 | Reserved |
| 01 | Only scheduling information for Paging is present in the DCI |
| 10 | Only short message is present in the DCI |
| 11 | Both scheduling information for Paging and short message are present in the DCI |

Table 3 below defines a short message. Bit 1 is a most significant bit.

TABLE 3

| Bit | Short Message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3-8 | Reserved |

A terminal may identify a short message indicator through PO monitoring 2005. The terminal may determine, through the short message indicator, whether there is a paging message. When it is determined, through the short message indicator, that there is a paging message, the terminal may receive a PDSCH (e.g., a paging message) 2010.

TABLE 4

```
Paging ::=                    SEQUENCE {
    pagingRecordList              PagingRecordList
OPTIONAL, -- Need N
    lateNonCriticalExtension      OCTET STRING
OPTIONAL,
    nonCriticalExtension          SEQUENCE { }
OPTIONAL
}
PagingRecordList ::=          SEQUENCE {SIZE(1..maxNrofPageRec)) OF PagingRecord
PagingRecord ::=              SEQUENCE {
ue-Identity                       PagingUE-Identity,
    accessType                        ENUMERATED {non3GPP} OPTIONAL, -- Need N
    ...
}
PagingUE-Identity ::=         CHOICE {
    ng-5G-S-TMSI                      NG-5G-S-TMSI,
    fullI-RNTI                        I-RNTI-Value,
    ...
}
```

A paging message format is as shown in Table 4 above. One paging message may include a list having PagingRecord as an entry, and each entry may include ue-Identity for indicating which terminal has paging. When the same PagingRecord as a UE identify (e.g., an S-TMSI or I-RNTI) of a terminal is discovered in the list, the terminal may start a process of transitioning to an RRC connection mode. On the contrary, when the terminal fails to discover the identity of the terminal in the list, it may be considered that the terminal has unnecessarily consumed power to monitor a PO and receive a paging message (PDSCH). This problem is represented by false wake-up of a terminal. In order to solve the false wake-up problem, wake-up signals (WUSs) and group wake-up signals (GWUSs) have been introduced in LTE.

Figure 21:
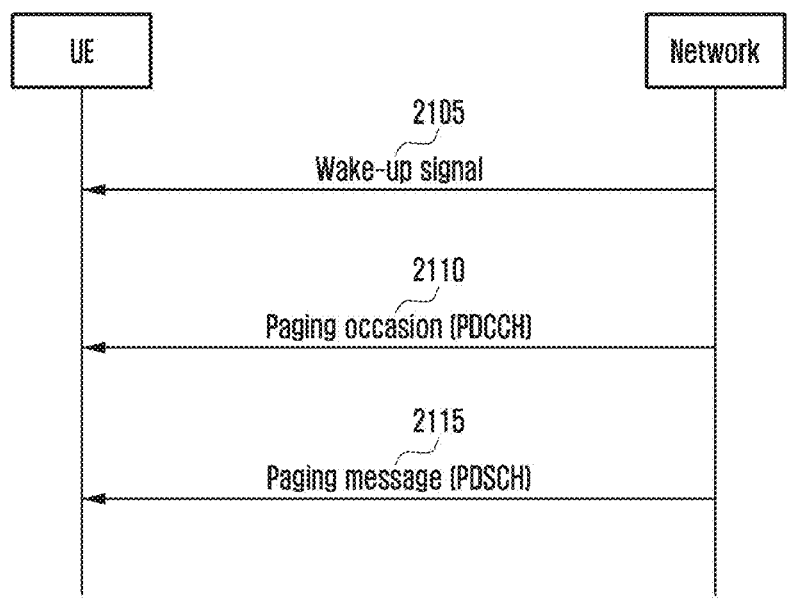
FIG. 21 is a diagram illustrating a procedure in which a base station (or network) broadcasts a WUS, a paging occasion, and a paging message in LTE.

FIG. 21 is a diagram illustrating a procedure in which a base station (or network) generally broadcasts a WUS, a paging occasion, and a paging message. A base station may transmit a WUS 2105 before transmitting a PO 2110. The WUS may indicate paging DCI being in the PO. In a case where a terminal supporting WUSs has received WUS configuration information through system information, the terminal may monitor a WUS by using the configuration information. The WUS monitoring may employ DRX. When the terminal has observed a WUS, the terminal may monitor the PO to receive a paging message 2115. When the terminal has failed to receive a WUS, the terminal may determine that paging DCI does not exist in the PO, and may not monitor the PO.

However, even when WUSs are used, false wake-up may still occur. For example, even when there is paging only one UE, a WUS is required to be transmitted. All terminals having received the WUS are required to receive a PO and a paging message for paging. This may cause a problem, and in order to solve the problem, group WUSs (GWUSs) have been introduced and may be used.

The purpose of GWUSs is to prevent all terminals from using only one common WUS, and to group terminals, assign one WUS to each terminal group, and thus eventually allow use of multiple WUSs. Each WUS may be implemented in a code-division multiplexing (CDM) scheme. Consequently, a terminal belonging to one group may monitor a WUS occasion. The terminal may compare a monitored WUS with a WUS assigned to a group to which the terminal belongs. When the terminal has discovered its own WUS, the terminal may monitor a corresponding PO, and otherwise, may not monitor the PO.

Figure 22:
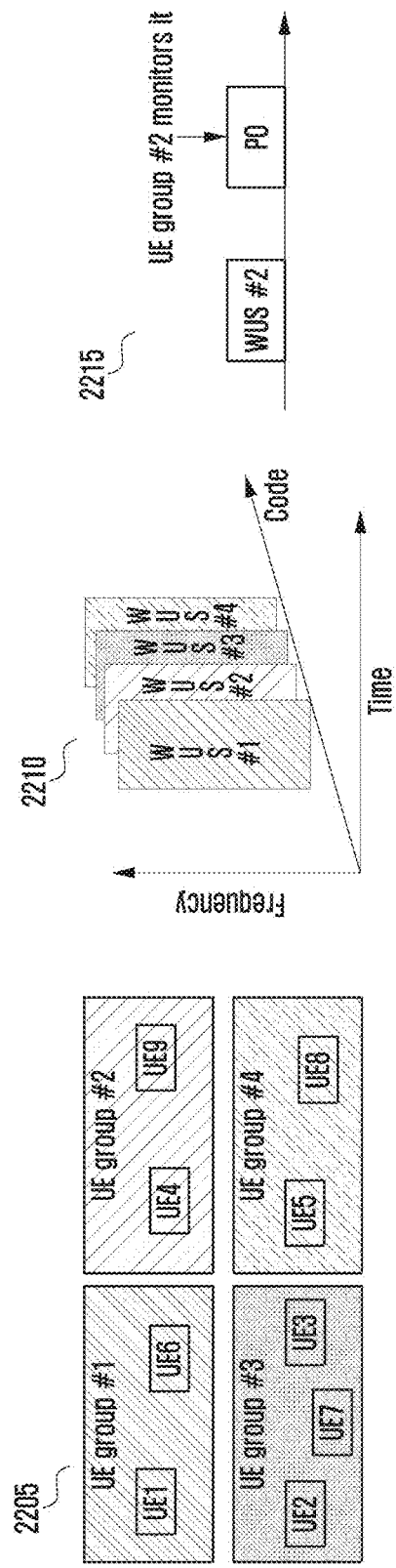
FIG. 22 is a diagram illustrating an example of using a GWUS.

FIG. 22 is a diagram illustrating an example of using a GWUS according to an embodiment.

In this example, a total of eight terminals are assumed, and are called from UE1 to UE8. In this example, the terminals may be grouped into a total of four groups (as indicated by reference numeral 2205). According to an embodiment, UE1 and UE6 belong to terminal group 1, UE4 and UE9 belong to terminal group 2, UE2, UE3, and UE7 belong to terminal group 3, and UE5 and UE8 belong to terminal group 4. There are also four types of WUSs used by respective four terminal groups, and resources allocated therefor are indicated by reference numeral 510. Each of the WUS resources uses common time/frequency resources, but may be distinguished by a CDM scheme. When WUS #2 (a WUS used by terminal group 2) is transmitted, UE4 and UE9 included in terminal group 2 may monitor a following PO (as indicated by reference numeral 2215). Meanwhile, the terminals other than UE4 and UE9 included in terminal group 2 may neither monitor the PO nor receive a corresponding paging message, thereby accomplishing energy saving.

FIG. 23 is a diagram illustrating general information exchanged between a terminal, an eNB, and an MME for terminal grouping, and a general process therefor.

A base station may broadcast GWUS-Config through system information for terminal grouping (operation 2305). The GWUS-Config may include information, such as gwus-ProbaThreshList (a paging probability threshold list) and gWUS-GroupsForServiceList (the number of WUS groups for each paging probability group).

A terminal may transmit its own paging probability to an MME by using an Attach Request or Tracking Area Update message (operation 2310). The MME may determine a negotiated paging probability by using the paging probability received from the terminal. The MME may perform the determination based on a local configuration and previous statistical information for the terminal. For example, the negotiated paging probability may be determined based on the number and frequency that paging has been transmitted to the terminal before. Thereafter, the MME may transmit the determined negotiated paging probability to the terminal. For transmission of the determined negotiated paging probability, an Attach Accept or TAU Accept message may be used (operation 2315). The MME may also store the negotiated paging probability as MME context, and when paging of the terminal is performed, may transfer the negotiated paging probability to an eNB (operation 2320).

Consequently, the terminal and the eNB may share the same GWUS-Config configuration and (negotiated) paging probability, and proceed terminal grouping through same. Specifically, gwus-ProbaThreshList included in GWUS-Config may include multiple (N number of) paging probability thresholds (e.g., threshold 1, threshold 2, . . . , threshold N). A terminal having a paging probability identical to or smaller than threshold 1 may belong to a first terminal group set. A terminal having a paging probability greater than threshold 1 and identical to or smaller than threshold 2 may belong to a second terminal group set. A terminal having a paging probability greater than threshold 2 and identical to or smaller than threshold 3 may belong to a third terminal group set. In the same scheme, a total of (N+1) number of terminal group sets may exist. A terminal may select one terminal group set according to the scheme by using the paging probability of the terminal. The one terminal group set includes multiple terminal groups, and the terminal may select one terminal group there among by using the identity of the terminal.

The disclosure has been made to solve a problem of signaling for LTE terminal grouping as described below.

In LTE, a terminal and an eNB both determine a group of the terminal. For determination of a group of the terminal, the eNB is required to include GWUS-Config in an SIB and transfer same to the terminal, and thus overhead for GWUSs may occur.

A paging probability considered in LTE is a core network (CN) initiated paging probability (PCN). However, in NR, since an RRC_INACTVE mode is newly introduced, RAN initiated paging is possible, and thus a design considering a RAN initiated paging probability (PRAN) is required.

Moreover, in NR, there is necessity to design a method for managing a PCN and a PRAN according to transition of the RRC mode of a terminal, including an RRC_INACTIVE mode.

Figure 24:
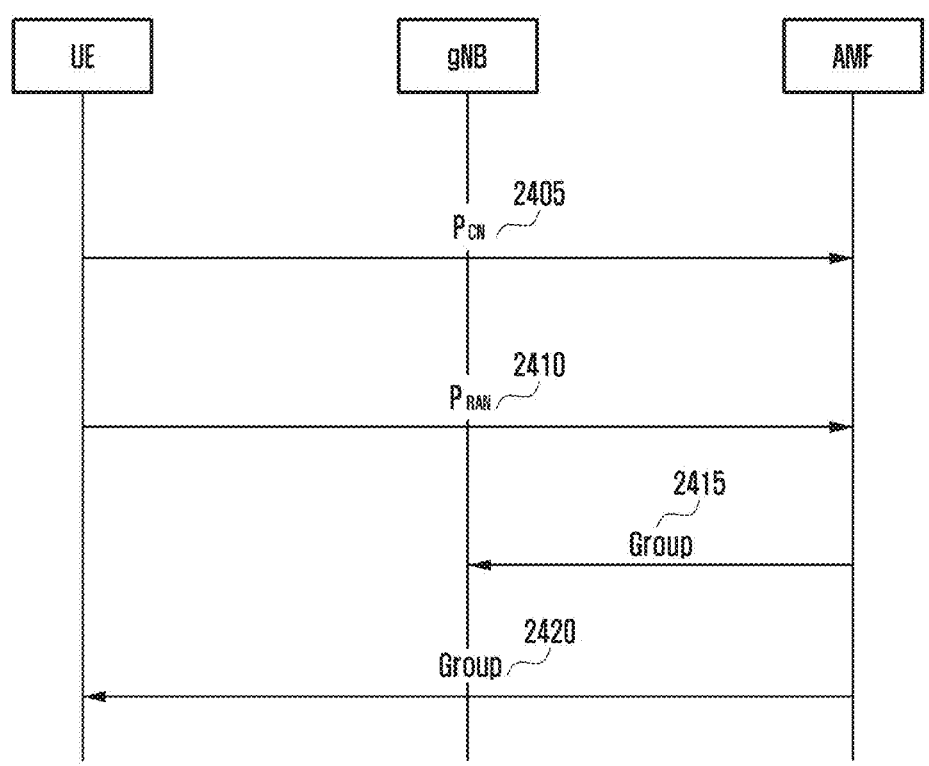
FIG. 24 is a diagram illustrating a procedure in which an AMF determines a terminal group by using a RAN initiated paging probability and a CN initiated paging probability as an embodiment of the disclosure.

FIG. 24 is a diagram illustrating a procedure in which an AMF determines a terminal group by using a RAN initiated paging probability ($P_{RAN}$) and a CN initiated paging probability ($P_{CN}$) as an embodiment of the disclosure.

A terminal may transfer a $P_{CN}$ measured by the terminal to an AMF (operation 2405). The terminal may transfer the $P_{CN}$ by using a registration request or a tracking area update request. The terminal may transfer a $P_{RAN}$ measured by the terminal to the AMF by using a NAS message (operation 2410). The AMF may also update the $P_{CN}$ and $P_{RAN}$, based on previous $P_{CN}$ and $P_{RAN}$ information and a local configuration. The AMF may determine a group of the terminal for WUSs by using the $P_{CN}$ and $P_{RAN}$. The AMF may inform the terminal and a gNB of the determined group (operations 2415 and 2420). For example, the AMF may transmit information on the determined group to at least one of the terminal and the gNB. Alternatively, the AMF may inform the terminal and the gNB of the identity of a WUS corresponding to the determined group. Alternatively, the AMF may inform the gNB of the information and the gNB may transfer same to the UE again. According to this embodiment, there is no need to exchange a large amount of information for grouping, such as gwus-ProbaThreshList and gWUS-GroupsForServiceList in GWUS-Config transferred through an SIB, and only a determined group or identify information of a WUS corresponding to a determined group may be simply exchanged. In addition, the embodiment may support terminal grouping using a $P_{RAN}$ as well as a $P_{CN}$.

Figure 25:
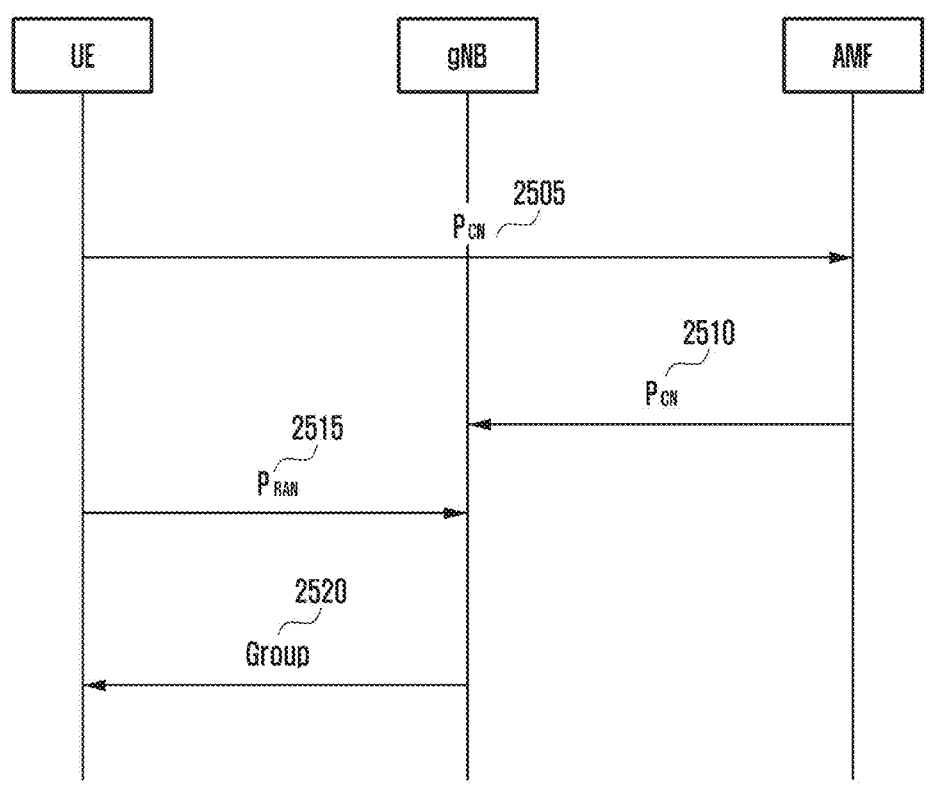
FIG. 25 is a diagram illustrating a procedure in which a gNB determines a terminal group by using a RAN initiated paging probability and a CN initiated paging probability as an embodiment of the disclosure.

FIG. 25 is a diagram illustrating a procedure in which a gNB determines a terminal group by using a RAN initiated paging probability ($P_{RAN}$) and a CN initiated paging probability ($P_{CN}$) as an embodiment of the disclosure.

A terminal may transfer a $P_{CN}$ measured by the terminal to an AMF (operation 2505). The terminal may transfer the $P_{CN}$ by using a registration request or a tracking area update request. The AMF may update the $P_{CN}$ based on a previous $P_{CN}$ of the terminal and a local configuration, and may transfer the updated information to a gNB (operation 2510). Alternatively, the terminal may directly report information of a paging probability ($P_{CN}$) to the gNB through RRC. The terminal may transfer a $P_{RAN}$ measured by the terminal to the gNB by using an RRC message (operation 2515). The gNB may also update the $P_{CN}$ and $P_{RAN}$, based on previous $P_{CN}$ and $P_{RAN}$ information of the terminal and a local configuration. The gNB may determine a group of the terminal for WUSs by using the $P_{CN}$ and $P_{RAN}$. The gNB may inform the terminal of the determined group (operation 2520). Alternatively, the gNB may inform the terminal of the identity of a WUS corresponding to the determined group. According to this embodiment, there is no need to exchange a large amount of information for grouping, such as gwus-ProbaThreshList and gWUS-GroupsForServiceList in GWUS-Config transferred through an SIB, and only a determined group or identify information of a WUS corresponding to a determined group may be simply exchanged. In addition, terminal grouping using a $P_{RAN}$ as well as a $P_{CN}$ may be supported.

Figure 26:
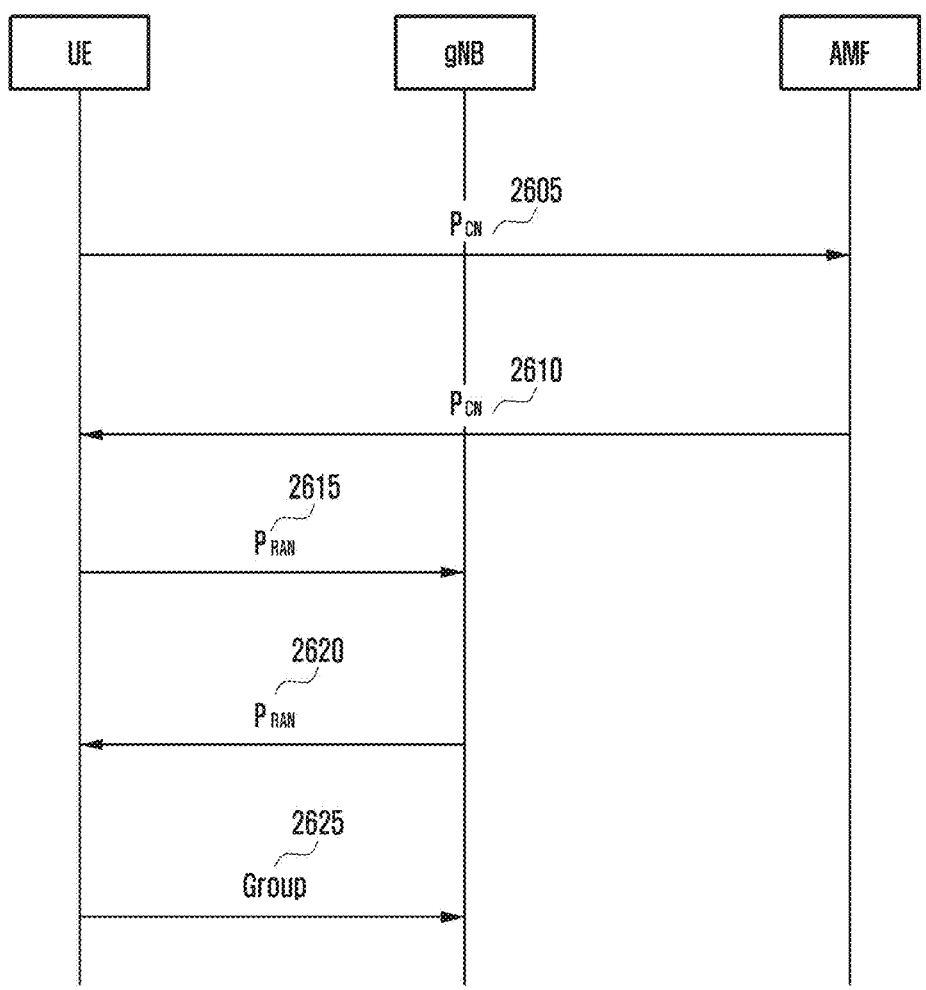
FIG. 26 is a diagram illustrating a procedure in which a terminal determines a terminal group by using a RAN initiated paging probability and a CN initiated paging probability as an embodiment of the disclosure.

FIG. 26 is a diagram illustrating a procedure in which a terminal determines a terminal group by using a RAN initiated paging probability ($P_{RAN}$) and a CN initiated paging probability ($P_{CN}$) as an embodiment of the disclosure.

A terminal may transfer a $P_{CN}$ measured by the terminal to an AMF (operation 2605). The terminal may transfer the $P_{CN}$ by using a registration request or a tracking area update request. The AMF may update the $P_{CN}$ based on a previous $P_{CN}$ of the terminal and a local configuration. The AMF may transfer the updated $P_{CN}$ to the terminal by using a registration accept or tracking area update accept message (operation 2610). The terminal may transfer a $P_{RAN}$ to a gNB by using an RRC message (operation 2615). The gNB may update a $P_{RAN}$, based on previous $P_{RAN}$ information of the terminal and a local configuration. The gNB may transfer the updated $P_{RAN}$ to the terminal (operation 2620). Alternatively, the terminal may also use a $P_{CN}$ measured by the terminal without the $P_{CN}$ exchange procedures 2605 and 2610. Alternatively, the terminal may also use a $P_{RAN}$ measured by the terminal without the $P_{RAN}$ exchange procedures 2615 and 2620.

Alternatively, the terminal may also use a $P_{CN}/P_{RAN}$ measured by the terminal without the $P_{CN}/P_{RAN}$ exchange procedures 2605, 2610, 2615, and 2620. The terminal may determine a group of the terminal for WUSs by using the $P_{CN}$ and $P_{RAN}$. The terminal may inform the gNB of the determined group (operation 2625). Alternatively, the terminal may inform the gNB of the identity of a WUS corresponding to the determined group. According to this embodiment, there is no need to exchange a large amount of information for grouping, such as gwus-ProbaThreshList and gWUS-GroupsForServiceList in GWUS-Config transferred through an SIB, and only a determined group or identify information of a WUS corresponding to a determined group may be simply exchanged. In addition, terminal grouping using a $P_{RAN}$ as well as a $P_{CN}$ may be supported. In addition, according to an embodiment of the disclosure, as described above, the procedures 2605 to 2620 may be omitted or simplified, and thus information and a procedure required for signaling may be reduced.

Figure 27:
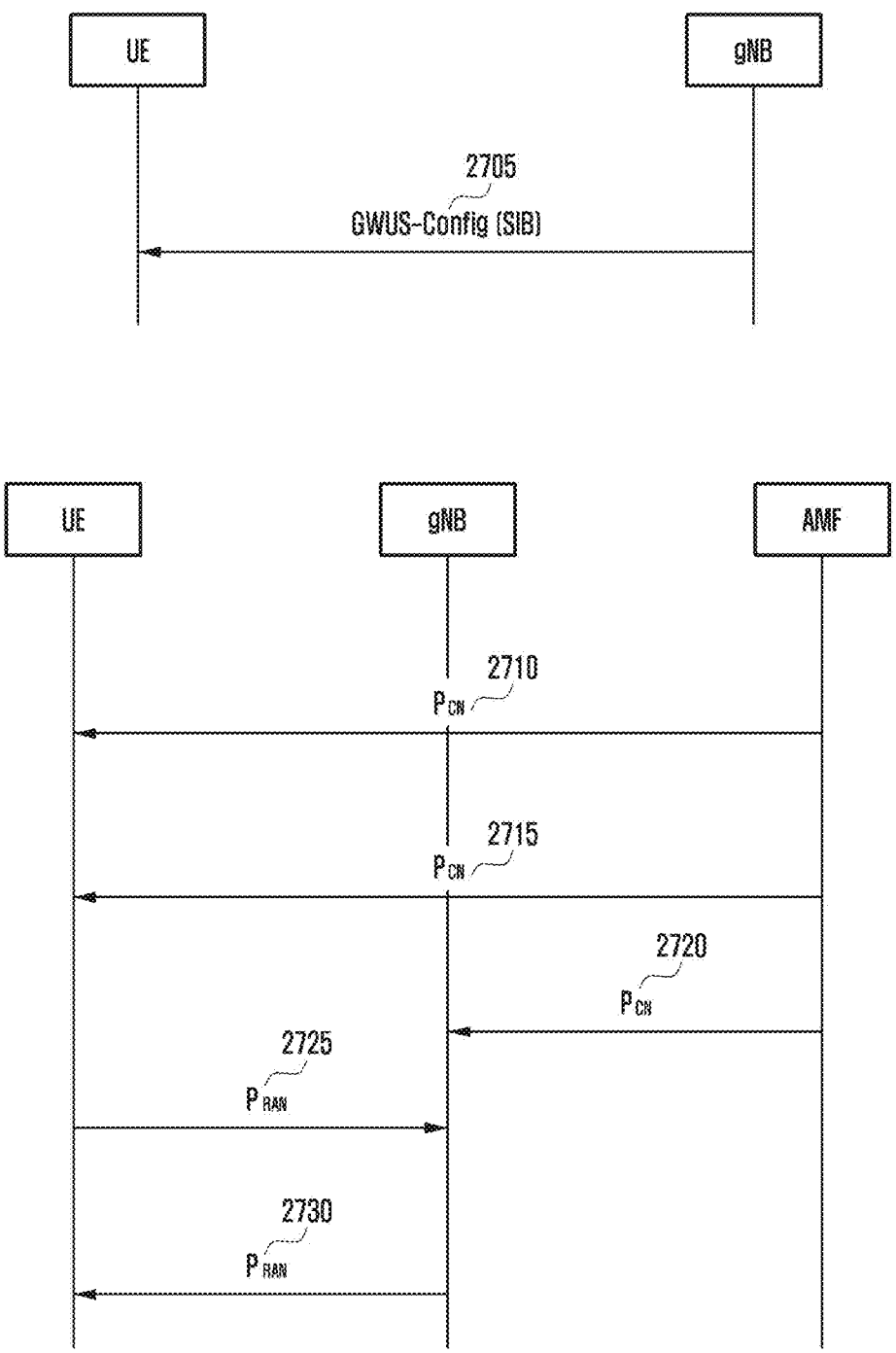
FIG. 27 is a diagram illustrating a procedure in which each of a terminal and a gNB determines a terminal group by using a RAN initiated paging probability and a CN initiated paging probability as an embodiment of the disclosure.

FIG. 27 is a diagram illustrating a procedure in which each of a terminal and a gNB determines a terminal group by using a RAN initiated paging probability ($P_{RAN}$) and a CN initiated paging probability ($P_{CN}$) as an embodiment of the disclosure.

A base station may broadcast GWUS-Config through system information for terminal grouping (operation 2705). The GWUS-Config may include information, such as gwus-ProbaThreshList (a paging probability threshold list) and gWUS-GroupsForServiceList (the number of WUS groups for each paging probability group). Other than the information, information for supporting terminal grouping using a $P_{CN}$ and $P_{RAN}$ may be included.

A terminal may transmit a $P_{CN}$ to an AMF by using an Attach Request or Tracking Area Update message (operation 2710). The AMF may determine a negotiated $P_{CN}$ by using the $P_{CN}$ received from the terminal, based on a local configuration and previous statistical information for the terminal. Thereafter, the AMF may transmit the determined negotiated $P_{CN}$ to the terminal, and may use an Attach Accept or TAU Accept message for the transmission (operation 2715). The AMF may also store the negotiated $P_{CN}$ as AMF context. The AMF may transfer the negotiated $P_{CN}$ to a gNB when paging of the terminal is performed (operation 2720).

The terminal may transfer a $P_{RAN}$ to the gNB through an RRC message (operation 2725). The gNB may determine a negotiated $P_{RAN}$ by using the $P_{RAN}$ received from the terminal. The gNB may perform the determination based on a local configuration and previous statistical information for the terminal. Thereafter, the gNB may transmit the determined negotiated $P_{RAN}$ to the terminal, and may use an RRC message for the transmission (operation 2730).

Consequently, the terminal and the gNB may share the same GWUS-Config configuration, $P_{CN}$, and $P_{RAN}$, and proceed terminal grouping through same.

According to this embodiment, terminal grouping using a $P_{RAN}$ as well as a $P_{CN}$ may be supported.

As an embodiment of the disclosure, a method for selecting a terminal group by using a RAN initiated paging probability ($P_{RAN}$) and a CN initiated paging probability ($P_{CN}$) and monitoring a WUS may be as follows.

The following methods may be used together with FIG. 24, FIG. 25, FIG. 26, and FIG. 27. One terminal group may be selected using a $P_{RAN}$ and $P_{CN}$, and various methods as below are possible.

Method 1: One terminal group set may be selected through size comparison with pre-defined paging probability thresholds by using a $P_{paging}$ ($=P_{RAN} P_{CN}$), and the identity of a terminal may be used to select one terminal group therein. Alternatively, one terminal group may also be selected through size comparison with pre-defined paging probability thresholds by using a $P_{paging}$.

Method 2: One terminal group set may be selected through size comparison with pre-defined paging probability thresholds by using a $P_{paging}$ (=Min [1, $P_{RAN}$+ $P_{CN}$]), and the identity of a terminal may be used to select one terminal group therein. Alternatively, one terminal group may also be selected through size comparison with pre-defined paging probability thresholds by using a $P_{paging}$.

Method 3: One terminal group set may be selected through size comparison with pre-defined paging probability thresholds by using a $P_{paging}$ (=Max [$P_{RAN}$, $P_{CN}$]), and the identity of a terminal may be used to select one terminal group therein. Alternatively, one terminal group may also be selected through size comparison with pre-defined paging probability thresholds by using a $P_{paging}$.

When one terminal group is selected, a (pre-defined) WUS corresponding thereto may be selected and used. A terminal may monitor a WUS resource immediately before a PO, and when the selected WUS exists, may monitor the PO. When the selected WUS is not detected, the terminal may not monitor the PO.

Next, two terminal groups may be independently selected using a $P_{RAN}$ and $P_{CN}$. One terminal group set may be selected through size comparison with pre-defined paging probability thresholds (thresholds for a $P_{RAN}$ and thresholds for a $P_{CN}$ may be the same or different from each other) by using each of the two values, and the identity of a terminal may be used to select one terminal group in each set. Therefore, a total of two terminal groups may be selected. Alternatively, one terminal group (a total of two groups) may be selected through size comparison with pre-defined paging probability thresholds (thresholds for a $P_{RAN}$ and thresholds for a $P_{CN}$ may be the same or different from each other) by using each of a $P_{RAN}$ and $P_{CN}$. Two WUSs corresponding to the respective terminal groups may be picked through pre-defined mapping, and the terminal may monitor all the two WUS before a PO. When one WUS among the two WUSs is detected, the terminal monitors the PO. When all the two WUS are not detected, the terminal may not monitor the PO.

As an embodiment of the disclosure, a method for managing and updating a RAN initiated paging probability ($P_{RAN}$) and a CN initiated paging probability ($P_{CN}$) may be as follows.

When a terminal is in an RRC_IDLE mode,
the terminal maintains a $P_{CN}$ in a case of performing cell reselection in an existing tracking area.
the terminal may perform a procedure of updating to a new $P_{CN}$ because an area receiving CN initiated paging is changed in a case of performing cell selection in a tracking area different from an existing tracking area. The terminal may transmit a new $P_{CN}$ to an AMF by using a tracking area update (TAU) request message. The AMF having received the $P_{CN}$ may initialize the $P_{CN}$ or update the $P_{CN}$ through previous information for the terminal and local information. Thereafter, the AMF may transfer the updated $P_{CN}$ to the terminal through a TAU accept message.

When a terminal is in an RRC_CONNECTED mode,
new $P_{CN}$ updating is required when TAU is performed. The terminal may transmit a tracking area update (TAU) request message including a new $P_{CN}$ to an AMF. The AMF having received the new $P_{CN}$ may initialize the $P_{CN}$ or update the $P_{CN}$ through previous information for the terminal and local information. Thereafter, the AMF may transfer the updated $P_{CN}$ to the terminal through a TAU accept message.

When a terminal is in an RRC_INACTIVE mode,
the terminal may maintain a $P_{RAN}$ in a case of performing cell reselection in an existing RAN notification area (RNA).
the terminal may perform a procedure of updating to a new $P_{RAN}$ because an area receiving RAN initiated paging is changed in a case of performing cell selection in an RNA different from an existing RNA. The terminal may transmit an RRCResumeRequest or RRCResumeRequest1 message to a gNB. A Cause value may be configured to be RAN update. The gNB having received the RRC message may initialize a $P_{RAN}$ or update the $P_{RAN}$ through previous information for the terminal and local information. Thereafter, the gNB may transfer the updated $P_{RAN}$ to the terminal through an RRC message.

In a case where a terminal transitions from an IDLE mode to a CONNECTED mode, it is possible to perform TAU in the IDLE mode or CONNECTED mode. Therefore, the terminal may perform a $P_{CN}$ update procedure every time the transition occurs.

In a case where a terminal transitions from an INACTIVE mode to a CONNECTED mode, RNA update is impossible in the CONNECTED mode, and thus the terminal is unable to perform $P_{RAN}$ updating. Therefore, two options as below are possible.

At the time of the mode transition, the terminal may maintain a $P_{RAN}$. When a $P_{RAN}$ is maintained, delta signaling may be used. Specifically, in a case where the terminal transitions to the INACTIVE mode again in the process of maintaining a previous $P_{RAN}$ in the CONNECTED mode, when a base station informs the terminal of a new $P_{RAN}$ through an RRCRelease message, the terminal may update the $P_{RAN}$ (an indication to erase the $P_{RAN}$ is also possible). On the contrary, when the base station does not inform the terminal of a new $P_{RAN}$ through an RRCRelease message, the terminal may use the previous $P_{RAN}$, which the terminal has been maintaining, as it is.

At the time of the mode transition, the terminal may erase a $P_{RAN}$. In a case where a $P_{RAN}$ is erased, and the terminal having transitioned to the CONNECTED mode transitions to the INACTIVE mode again, when a base station informs the terminal of a new $P_{RAN}$ value through an RRCRelease message, the terminal may update to the $P_{RAN}$ value. Otherwise, there is no $P_{RAN}$ information, and thus it is impossible to perform a procedure of determining a terminal group. Therefore, the terminal may not monitor a WUS and monitor all POs.

In both the two options, GWUS information, such as a paging probability threshold, as well as a $P_{RAN}$ may be transmitted through RRCRelease.

In a case where a terminal transitions from an INACTIVE mode to an IDLE mode, a $P_{RAN}$ is no more valid, and thus the terminal may erase the $P_{RAN}$.

When the terminal fails to receive information related to WUS grouping, or while the information does not exist, the terminal may not monitor a WUS and monitor all POs.

Figure 28:
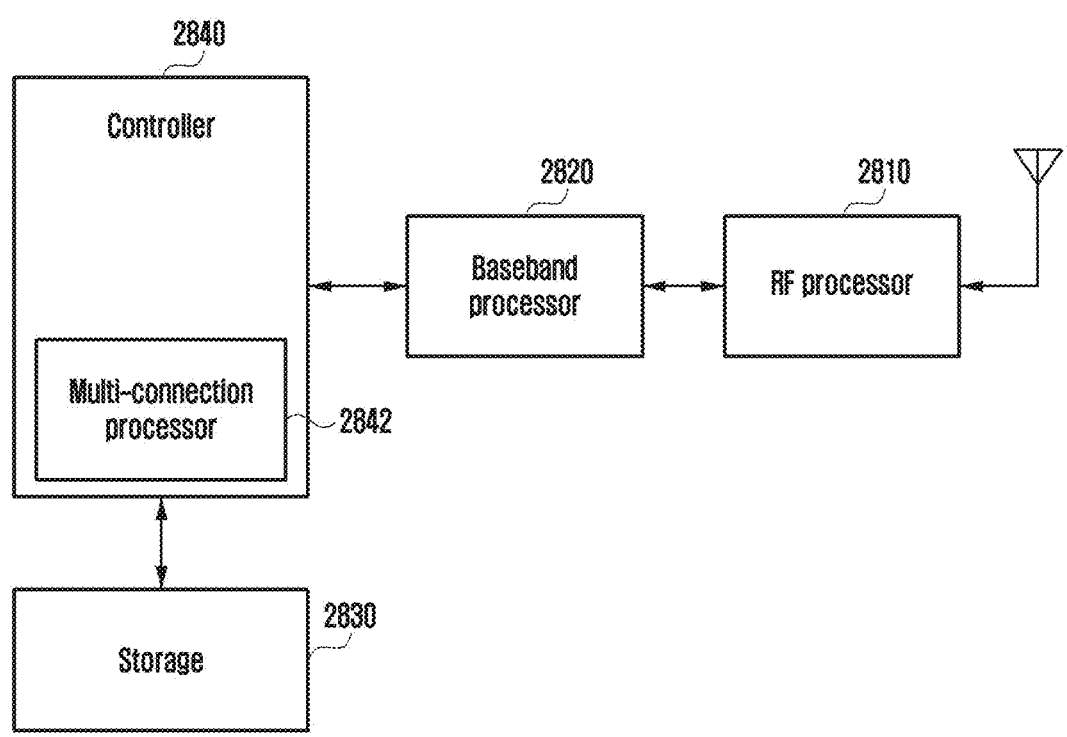
FIG. 28 is a diagram illustrating a terminal device according to embodiments of the disclosure.

FIG. 28 is a diagram illustrating a terminal device according to embodiments of the disclosure.

Referring to FIG. 28, a terminal may include a radio frequency (RF) processor 2810, a baseband processor 2820, a storage 2830, and a controller 2840. However, the disclosure is not limited to the example, and the terminal may include a smaller or larger number of elements, compared to the elements illustrated in FIG. 11.

The RF processor 2810 may perform a function, such as signal band change, amplification, etc., for transmitting or receiving a signal through a wireless channel. For example, the RF processor 2810 may upconvert a baseband signal provided from the baseband processor 2820, into an RF band signal, and then transmit the RF band signal through an antenna, and may downconvert an RF band signal received through an antenna, into a baseband signal. For example, the RF processor 2810 may include a transmission filter, a reception filter, an amplifier, a mixer, an oscillator, a digital-to-analog converter (DAC), an analog-to-digital converter (ADC), and the like. The disclosure is not limited to the example. In FIG. 28, only one antenna is illustrated, but the terminal may include a plurality of antennas. Furthermore, the RF processor 2810 may include a plurality of RF chains. Moreover, the RF processor 2810 may perform beamforming. To perform beamforming, the RF processor 2810 may adjust the phase and size of each of signals transmitted or received through a plurality of antennas or antenna elements. In addition, the RF processor 2810 may perform MIMO, and may receive several layers when a MIMO operation is performed.

The baseband processor 2820 may perform a function of conversion between a baseband signal and a bitstream according to a physical layer standard of a system. For example, when data is transmitted, the baseband processor 2820 may generate complex symbols by encoding and modulating a transmission bitstream. In addition, when data is received, the baseband processor 2820 reconstructs a reception bit stream by demodulating and decoding a baseband signal provided from the RF processor 2810. For example, in a case where an orthogonal frequency division multiplexing (OFDM) scheme is applied, when data is transmitted, the baseband processor 2820 may generate complex symbols by encoding and modulating a transmission bitstream, map the generated complex symbols to subcarriers, and then configure OFDM symbols through inverse fast Fourier transform (IFFT) calculation and cyclic prefix (CP) insertion. In addition, when data is received, the baseband processor 2820 may divide a baseband signal provided from the RF processor 2810, by the units of OFDM symbols, reconstruct signals mapped to subcarriers, through fast Fourier transform (FFT) calculation, and then reconstruct a reception bit stream through demodulation and decoding.

The baseband processor 2820 and the RF processor 2810 may transmit and receive a signal as described above. Accordingly, the baseband processor 2820 and the RF processor 2810 may be called a transmitter, a receiver, a transceiver, or a communicator. Furthermore, at least one of the baseband processor 2820 and the RF processor 2810 may include a plurality of communication modules to support a plurality of different wireless access techniques. In addition, at least one of the baseband processor 2820 and the RF processor 2810 may include different communication modules to process signals in different frequency bands. For example, the different wireless access techniques may include wireless LAN (e.g., IEEE 802.11), a cellular network (e.g., LTE), etc. Furthermore, the different frequency bands may include a super high frequency (SHF) (e.g., 2.NRHz, NRhz) band, a millimeter (mm) wave (e.g., 60 GHz) band, etc. The terminal may exchange a signal with a base station by using the baseband processor 2820 and the RF processor 2810, and the signal may include control information and data.

The storage 2830 may store data such as a basic program, an application program, and configuration information for an operation of the terminal. For example, the storage 2830 may store data information, such as a basic program, an application program, and configuration information for an operation of the terminal, as described above. The storage 2830 may provide stored data in response to a request of the controller 2840.

The storage 2830 may be configured by a storage medium such as ROM, RAM, hard disk, CD-ROM, and DVD, or a combination of storage mediums. In addition, the storage 2830 may be configured by a plurality of memories. According to an embodiment of the disclosure, the storage 2830 may store a program for performing a handover method according to the disclosure.

The controller 2840 may control overall operations of the terminal. For example, the controller 2840 may transmit or receive a signal via the baseband processor 2820 and the RF processor 2810.

In addition, the controller 2840 may record and read data in and from the storage 2830. To this end, the controller 2840 may include at least one processor. For example, the controller 2840 may include a communication processor (CP) performing a control for communication, and an application processor (AP) controlling a higher layer, such as an application program. In addition, according to an embodiment of the disclosure, the controller 2840 may include a multi-connection processor 2842 configured to process a process operated in a multi-connection mode. In addition, at least one element in the terminal may be implemented as a single chip.

Figure 29:
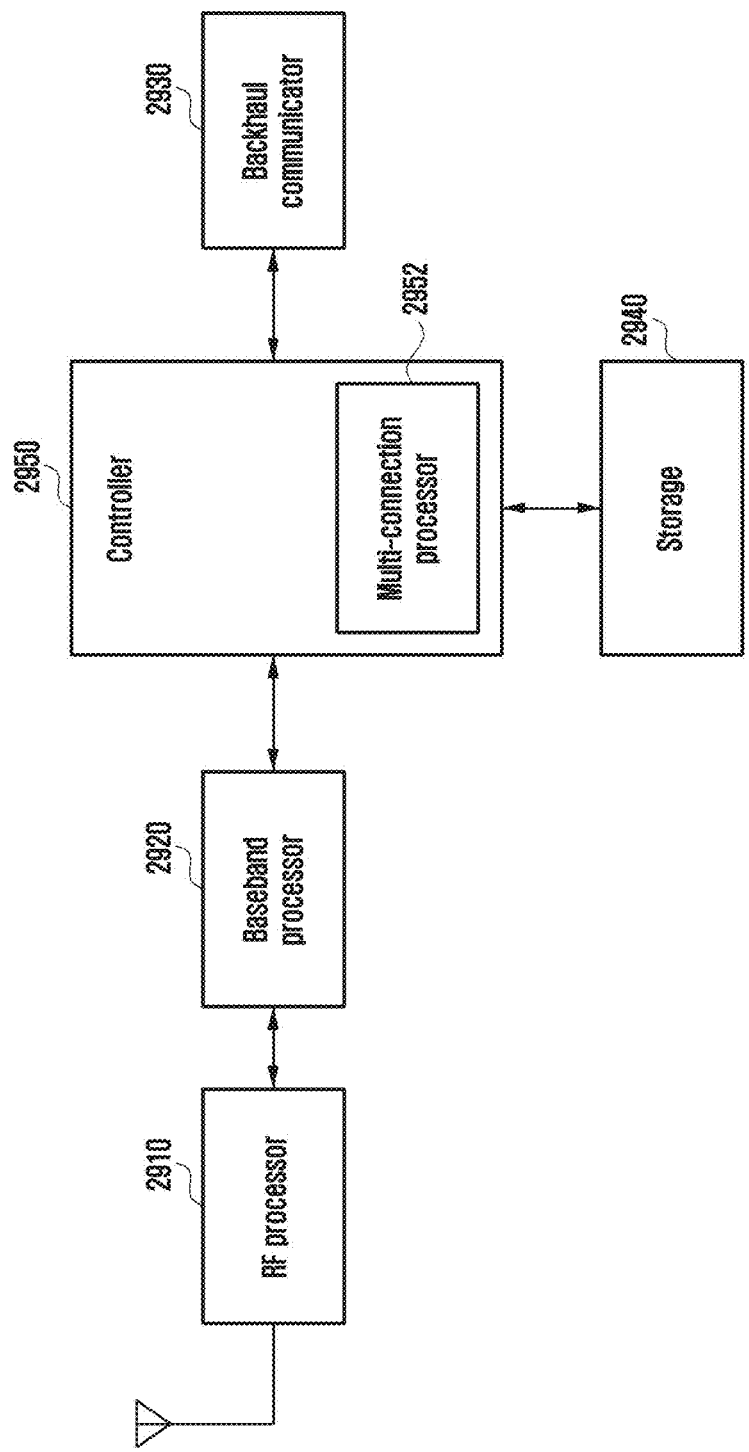
FIG. 29 is a diagram illustrating a base station device according to embodiments of the disclosure.

FIG. 29 is a diagram illustrating a base station device according to embodiments of the disclosure.

A base station in FIG. 29 may be included in the network described above.

As illustrated in FIG. 29, the base station may include an RF processor 2910, a baseband processor 2920, a backhaul communicator 2930, a storage 2940, and a controller 2950. However, the disclosure is not limited to the example, and the base station may include a smaller or larger number of elements, compared to the elements illustrated in FIG. 29. The RF processor 2910 may perform a function, such as signal band change, amplification, etc., for transmitting or receiving a signal through a wireless channel. For example, the RF processor 2910 may upconvert a baseband signal provided from the baseband processor 2920, into an RF band signal, and then transmit the RF band signal through an antenna, and may downconvert an RF band signal received through the antenna, into a baseband signal. For example, the RF processor 2910 may include a transmission filter, a reception filter, an amplifier, a mixer, an oscillator, a DAC, an ADC, and the like. In FIG. 29, only one antenna is illustrated, but the RF processor 2910 may include a plurality of antennas. In addition, the RF processor 2910 may include a plurality of RF chains. Furthermore, the RF processor 2910 may perform beamforming. To perform the beamforming, the RF processor 2910 may adjust the phase and size of each of signals transmitted or received via a plurality of antennas or antenna elements. The RF processor 2910 may perform a downlink MIMO operation by transmitting at least one layer.

The baseband processor 2920 may perform a function of conversion between a baseband signal and a bitstream according to a physical layer standard. For example, when data is transmitted, the baseband processor 2920 may generate complex symbols by encoding and modulating a transmission bitstream. In addition, when data is received, the baseband processor 2920 reconstructs a reception bit stream by demodulating and decoding a baseband signal provided from the RF processor 2910. For example, in a case where an OFDM scheme is applied, when data is transmitted, the baseband processor 2920 may generate complex symbols by encoding and modulating a transmission bitstream, map the generated complex symbols to subcarriers, and then configure OFDM symbols through IFFT calculation and CP insertion. In addition, when data is received, the baseband processor 2920 may divide a baseband signal provided from the RF processor 2910, by the units of OFDM symbols, reconstruct signals mapped to subcarriers, through FFT, and then reconstruct a reception bit stream through demodulation and decoding. The baseband processor 2920 and the RF processor 2910 may transmit and receive a signal as described above. Accordingly, the baseband processor 2920 and the RF processor 2910 may be called a transmitter, a receiver, a transceiver, a communicator, or a wireless communicator. The base station may exchange a signal with a terminal by using the baseband processor 2920 and the RF processor 2910, and the signal may include control information and data.

The backhaul communicator 2930 may provide an interface for performing communication with other nodes within a network. For example, the backhaul communicator 2930 may convert, into a physical signal, a bit stream transmitted from the main base station to another node, for example, an auxiliary base station, a core network, etc., and may convert a physical signal received from another node, into a bit stream.

The storage 2940 may store data such as a basic program, an application program, and configuration information for an operation of the main base station. For example, the storage 2940 may store information on a bearer assigned to a connected terminal, a measurement result reported from a connected terminal, etc. In addition, the storage 2940 may store information serving as a determination criterion of whether to provide or stop providing multi-connection to a terminal. The storage 2940 may provide stored data in response to a request of the controller 2950. The storage 2940 may be configured by a storage medium such as ROM, RAM, hard disk, CD-ROM, and DVD, or a combination of storage mediums. In addition, the storage 2940 may be configured by a plurality of memories. According to an embodiment of the disclosure, the storage 2940 may store a program for performing a handover according to the disclosure.

The controller 2950 may control overall operations of the main base station. For example, the controller 2950 may transmit or receive a signal via the baseband processor 2920 and the RF processor 2910, or via the backhaul communicator 2930. In addition, the controller 2950 may record and read data in and from the storage 2940. To this end, the controller 2950 may include at least one processor. In addition, according to an embodiment of the disclosure, the controller 2950 may include a multi-connection processor 1252 configured to process a process operated in a multi-connection mode.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure. Therefore, the scope of the disclosure should not be defined as being limited to the embodiments set forth herein, but should be defined by the appended claims as described below and equivalents thereof. That is, it will be apparent to those skilled in the art that other variants based on the technical idea of the disclosure may be implemented. Further, the above respective embodiments may be employed in combination, as necessary. For example, the method proposed in the disclosure may be partially combined to operate a base station and a terminal. Further, although the above embodiments have been described on the basis of 5G and NR systems, other variants based on the technical idea of the embodiments may also be implemented in other systems such as LTE, LTE-A, and LTE-A-Pro systems.

While the disclosure has been shown and described with reference to various embodiments thereof, it will be understood by those of ordinary skill in the art that various changes in form and details may be made therein without departing from the spirit and scope of the disclosure as defined by the following claims and their equivalents.

What is claimed is:

1. A method performed by an access and mobility management function (AMF) entity in a wireless communication system, the method comprising:
   receiving, from a terminal, paging probability information;
   determining a paging group for the terminal based on the paging probability information; and
   transmitting, to the terminal, an identity corresponding to the determined paging group for the terminal.

2. The method of claim 1, further comprising transmitting, to a base station, the identity corresponding to the determined paging group for the terminal.

3. The method of claim 1, wherein the paging probability information is received using a registration request message, and
   wherein the identity corresponding to the determined paging group for the terminal is transmitted using a registration accept message.

4. The method of claim 1, wherein the paging group is used by the terminal for receiving an indication associated with a paging message before the paging message is transmitted.

5. A method performed by a terminal in a wireless communication system, the method comprising:
   identifying paging probability information;
   transmitting, to an access and mobility management function (AMF) entity, the identified paging probability information; and
   receiving, from the AMF entity, an identity corresponding to a paging group for the terminal, in case that the paging group for the terminal is determined based on the paging probability information by the AMF entity.

6. The method of claim 5, wherein the identity corresponding to the paging group for the terminal is transmitted to the base station.

7. The method of claim 5, wherein the paging probability information is received using a registration request message, and wherein the identity corresponding to the paging group for the terminal is transmitted using a registration accept message.

8. The method of claim 5, wherein the paging group is used by the terminal for receiving an indication associated with a paging message before the paging message is transmitted.

9. An access and mobility management function (AMF) entity in a wireless communication system, the AMF entity comprising:
   a transceiver; and
   at least one processor configured to:
      receive, from a terminal via the transceiver, paging probability information,
      determine a paging group for the terminal based on the paging probability information, and
      transmit, to the terminal via the transceiver, an identity corresponding to the determined paging group for the terminal.

10. The AMF entity of claim 9, wherein the at least one processor is further configured to transmit, to a base station via the transceiver, the identity corresponding to the determined paging group for the terminal.

11. The AMF entity of claim 9, wherein the paging probability information is received using a registration request message, and
   wherein the identity corresponding to the determined paging group for the terminal is transmitted using a registration accept message.

12. The AMF entity of claim 9, wherein the paging group is used by the terminal for receiving an indication associated with a paging message before the paging message is transmitted.

13. A terminal in a wireless communication system, the terminal comprising:
   a transceiver; and
   at least one processor configured to:
      identify paging probability information,
      transmit, to an access and mobility management function (AMF) entity via the transceiver, the identified paging probability information, and
      receive, from the AMF entity via the transceiver, an identity corresponding to a paging group for the terminal, in case that the paging group for the terminal is determined based on the paging probability information by the AMF entity.

14. The terminal of claim 13, wherein the identity corresponding to the paging group for the terminal is transmitted to the base station.

15. The terminal of claim 13, wherein the paging probability information is received using a registration request message, and
   wherein the identity corresponding to the paging group for the terminal is transmitted using a registration accept message.

16. The terminal of claim 13, wherein the paging group is used by the terminal for receiving an indication associated with a paging message before the paging message is transmitted.

* * * * *